United States Patent [19]

Ito

[11] Patent Number: 5,859,632
[45] Date of Patent: Jan. 12, 1999

[54] POWER CIRCUIT, LIQUID CRYSTAL DISPLAY DEVICE AND ELECTRONIC EQUIPMENT

[75] Inventor: Katsunori Ito, Suwa, Japan

[73] Assignee: Seiko Epson Corporation, Tokyo, Japan

[21] Appl. No.: 615,205

[22] PCT Filed: Jul. 12, 1995

[86] PCT No.: PCT/JP95/01387

§ 371 Date: Mar. 11, 1996

§ 102(e) Date: Mar. 11, 1996

[87] PCT Pub. No.: WO96/02865

PCT Pub. Date: Feb. 1, 1996

[30] Foreign Application Priority Data

Jul. 14, 1994 [JP] Japan .................................. 6-162378
Dec. 22, 1994 [JP] Japan .................................. 6-320906

[51] Int. Cl.⁶ ...................................................... G01G 5/00
[52] U.S. Cl. .............................................. 345/211; 345/95
[58] Field of Search .................................. 345/211, 204, 345/210, 87, 95, 52; 363/324, 325, 326; 323/225, 297; 349/33

[56] References Cited

U.S. PATENT DOCUMENTS

| | | | |
|---|---|---|---|
| 5,198,767 | 3/1993 | Haight | 345/95 |
| 5,343,217 | 8/1994 | Kim | 345/95 |
| 5,402,142 | 3/1995 | Okada et al. | 345/95 |
| 5,404,150 | 4/1995 | Murata | 345/95 |
| 5,510,814 | 4/1996 | Ise | 345/211 |

FOREIGN PATENT DOCUMENTS

| | | |
|---|---|---|
| 0 447 919 A2 | 9/1991 | European Pat. Off. . |
| 0 645 751 A1 | 3/1995 | European Pat. Off. . |
| 54-5399 | 1/1979 | Japan . |
| U-61-33091 | 2/1986 | Japan . |
| A-2-150819 | 6/1990 | Japan . |
| A-3-63998 | 3/1991 | Japan . |
| A-3-200214 | 9/1991 | Japan . |
| A-4-136981 | 5/1992 | Japan . |
| A-7-120718 | 5/1995 | Japan . |

*Primary Examiner*—Steven J. Saras
*Attorney, Agent, or Firm*—Oliff & Berridge, PLC

[57] ABSTRACT

A second group of drive voltages V3 to V5 has a voltage range that is separate from, and does not overlap a first group of drive voltages V0 to V2. The first group of drive voltages V0 to V2 is supplied from first power sources VDD and VSS through operational amplifiers OP1 and OP2. The second group of drive voltages V3 to V5 is set with reference to VEE, and is supplied from the first power sources VDD and VSS through the operational amplifiers OP1 and OP2. Voltage conversion capacitors C11 and C12 are charged by turning on and off a first group of switches SW11 to SW13, and are discharged by turning on and off a second group of switches SW14 to SW16, thus causing the output of the second group of drive voltages V3 to V5 which have references to VEE.

18 Claims, 20 Drawing Sheets

FIG. 22
FIG. 22(A)
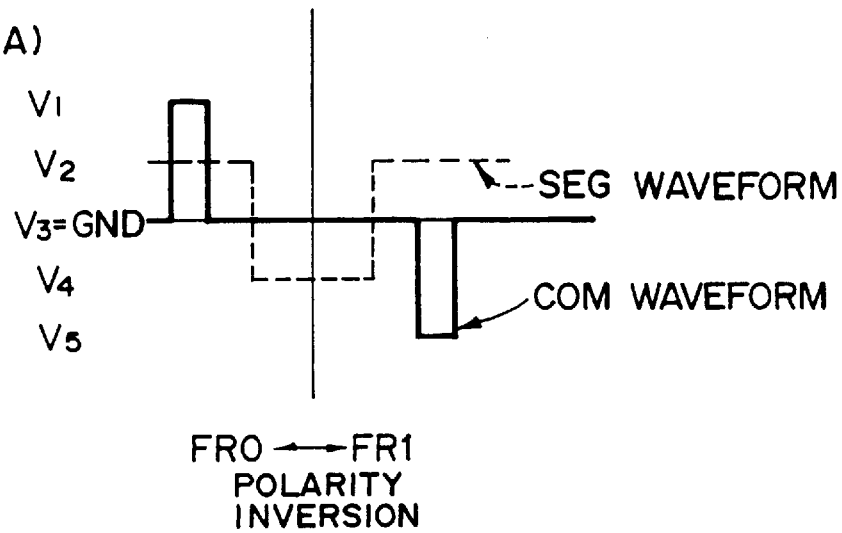
FIG. 22(B)
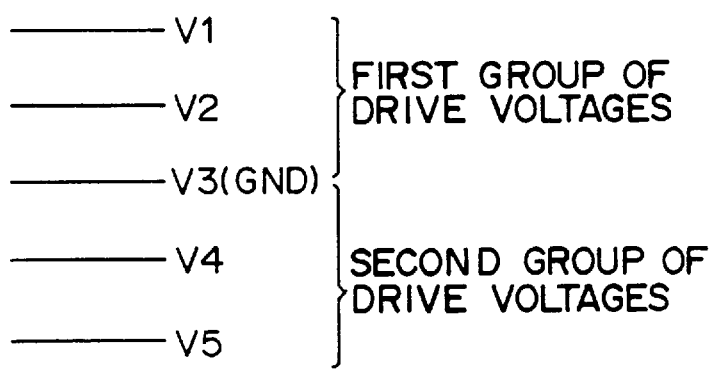
FIG. 22(C)
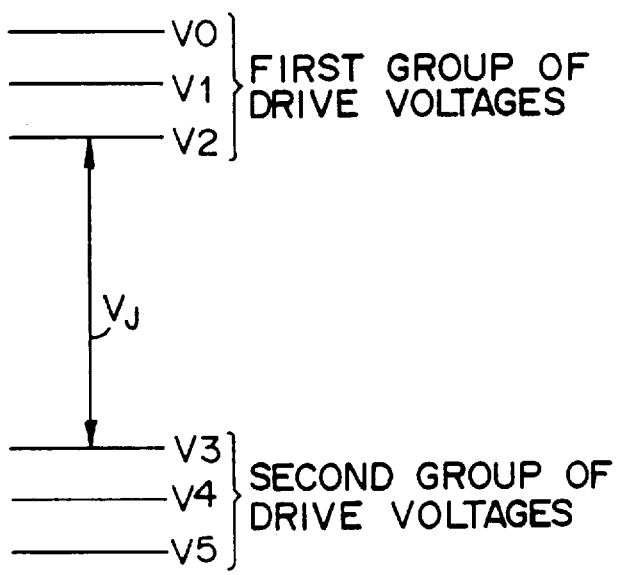

POWER CIRCUIT, LIQUID CRYSTAL DISPLAY DEVICE AND ELECTRONIC EQUIPMENT

BACKGROUND OF THE INVENTION

1. Technical Field

This invention relates to a power circuit, a liquid crystal display device incorporating this power circuit, and electronic equipment incorporating either the power circuit or the liquid crystal display device.

2. Related Art

FIG. 18 is a schematic diagram of electrodes of a liquid crystal panel that is multiplex driven. To simplify the description, this liquid crystal panel includes nine segment electrodes and six common electrodes. Each rectangle in this figure represents an electrode formed in the liquid crystal panel, and these electrodes are divided into segment electrodes (SEG1 to SEG9) and common electrodes (COM1 to COM6), depending on the signals that are applied thereto. The square shaded portion at each intersection of electrodes represents a display dot. To ensure that each display dot operates as a capacitor, a capacitor links the segment electrode and common electrode at a corresponding display dot.

Voltage levels V0 to V5 that are necessary for driving liquid crystal elements by a multiplex-driven method with a high duty ratio (six-level drive method) generally satisfy the relationships V0−V1=V1−V2 =V3−V4=V4−V5 and V0>V1>V2>V3>V4>V5, as shown in FIG. 19. In this case, it is assumed that V0 to V2 are a first group of drive voltages and V3 to V5 are a second group of drive voltages. The voltage range of the first group of drive voltages V0 to V2 does not overlap the voltage range of the second group of drive voltages V3 to V5, and is separate therefrom.

FIG. 19 shows examples of signal waveforms applied to the segment and common electrodes. The signal applied to a segment electrode generally switches between voltage levels V3 and V5 during the period of a frame 0 (hereinafter called FR0). Similarly, the signal switches between voltage levels V0 and V2 during the period of a frame 1 (hereinafter called FR1). This switching of the voltage level at the segment electrode depends on the pattern to be displayed.

At the same time, the signal applied to a common electrode is at voltage level V4 during a non-selected state in the FR0 period, or at voltage level V0 during a selected state. Similarly, the signal is at voltage level V1 during the non-selected state in the FR1 period, or at voltage level V5 during the selected state. The period during which a common electrode is in the selected state differs for all of the common electrodes, and it is not possible for a plurality of common electrodes to be simultaneously selected. Voltage levels are inverted between the FR0 and the FR1 periods, to drive the liquid crystal in an alternating fashion.

The switching of the voltage levels at the segment and common electrodes is in accordance with the charging and discharging of capacitances existing within the liquid crystal panel. This means that currents flow through the liquid crystal panel between each of the voltage levels V0 to V5. These currents are hereinafter called panel currents.

The voltage level of each segment electrode switches between V0 and V2 (in the FR1 period) or V3 and V5 (in the FR0 period). For a large proportion of the time, each common electrode is in a non-selected state, so the voltage level thereof is mostly at V1 (in the FR1 period) and at V4 (in the FR0 period). This means that a panel current caused by a switch in voltage level at a segment electrode (hereinafter called a segment panel current) flows mainly between the first group of drive voltages V0, V1, and V2 or the second group of drive voltages V3, V4 and V5. Similarly, a panel current caused by a switch in voltage level at a common electrode (hereinafter called a common panel current) flows mainly between V5 and a voltage within the first group of drive voltages V0, V1, and V2, or between V0 and a voltage within the second group of drive voltages V3, V4, and V5.

A power circuit that supplies the above panel currents is disclosed as a prior-art method in Japanese Patent Application Laid-Open No. 2-150819. The configuration thereof is shown in FIG. 20. In this figure, external power sources VDD and VEE are provided to drive the power circuit, where VDD is greater than VEE. Divided voltage levels V1' to V4' are generated between VDD and VEE by series-connected resistors R1 to R5. These divided voltage levels are input to operational amplifiers OP1 to OP4 that are each connected in a voltage-follower configuration. The operational amplifiers OP1 to OP4 use VDD and VEE as power sources to convert V1' to V4' by lowering the high impedances thereof. C1 to C4 denote smoothing capacitors that control variations in the output voltage levels V1 to V4 of the operational amplifiers OP1 to OP4. Resistors R8 to R11 limit the output currents of the operational amplifiers OP1 to OP4, and thus reduce the power consumption thereof.

However, this prior-art method has problems, as described below.

The first problem with this prior-art method concerns the way in which a large amount of power is wasted when panel currents are supplied. The reason for this is as follows. When a liquid crystal panel is driven using this power circuit, panel currents are supplied as part of the current flowing from VDD to VEE. Consider, for example, a segment panel current flowing from voltage level V3 to V4. This segment panel current flows out initially from the power source VDD and into the liquid crystal panel through the operational amplifier OP3, as shown in FIG. 21. This current from the liquid crystal panel flows into the power source VEE through the operational amplifier OP4. When a segment panel current is supplied in this fashion from voltage level V3 to V4, the current flowing from VDD to V3 causes the operational amplifier OP3 to generate heat. Similarly, the current flowing from V4 to VEE causes the operational amplifier OP4 to generate heat. In other words, these currents do not operate efficiently in the driving of the liquid crystal panel. All the other panel currents are equally inefficient. This means that the use of the power circuit of FIG. 20 for supplying the common panel currents and segment panel currents leads to wasteful consumption of power as heat generation of the operational amplifiers. In this particular example, the common panel currents mainly flow between V5 and a voltage within the first group of drive voltages V0, V1 and V2, or between V0 and a voltage within the second group of drive voltages V3, V4 and V5. Therefore, there is a large voltage difference between the voltage levels that these currents flow between, and there is only a small difference between these voltages and the voltage between the power sources VDD and VEE. In contrast, the segment panel currents mainly flow between voltages within the first group of drive voltages V0, V1 and V2, or between voltages within the second group of drive voltages V3, V4 and V5. Therefore, there is a small voltage difference between the voltage levels that these currents flow between, and there is a large difference between these voltages and the voltage between the power sources VDD and VEE. Thus it is clear that the proportion of power that is wasted by such components as the operational amplifiers is greater, when supplying a segment panel current than supplying a common panel current. In other words, in order to prevent such waste of power, it is necessary to improve the method used to supply segment panel currents.

The second problem with this prior-art method concerns the large power consumption caused by idling currents in the operational amplifiers. In other words, the operational amplifiers OP1 to OP4 of the prior art are driven by the power sources VDD and VEE, as shown in FIG. 20. However, since these power sources VDD and VEE are also used as power sources for generating the drive voltages for the liquid crystal panel, the voltage between VDD and VEE is extremely large. For a constant current, power consumption is proportional to voltage. Therefore, if the voltage between VDD and VEE increases, the power wasted by the idling currents in the operational amplifiers OP1 to OP4 also increases.

The third problem with this prior-art method concerns the way in which the above described use of power sources VDD and VEE with a large voltage difference therebetween requires expensive operational amplifiers that can withstand such high voltages.

To design a liquid crystal display device with a higher duty ratio, it is generally necessary to increase the voltage between the power sources VDD and VEE even further. This would further aggravate the above described three problems.

Note that another prior-art method for a power circuit that supplies power to a liquid crystal panel is disclosed in Japanese Patent Application Laid-Open No. 3-200214, whereby a switched capacitor circuit is used to generate voltage level V5 from V1 and voltage level V4 from V2. However, this prior-art method has the objectives of reducing the number of operational amplifiers or the amount of wiring between the power circuit and the liquid crystal panel for implementing a smaller device. Nevertheless, the prior art does not have the objective of reducing the power consumption, unlike the present invention.

In addition, this prior-art method has a five-level output wherein the voltage of a common electrode when it is not selected is the same (V3=GND) before and after each polarity inversion, in other words, during the FR0 and FR1 periods of FIG. 22(A). In order to increase duty ratio for driving the liquid crystal with this power source configuration, it is necessary to increase the voltages between V1 and V3 and between V3 and V5, as shown in FIG. 22(B). This causes a problem in that it requires provision of a high-voltage-withstanding driver chip for driving the liquid crystal. Therefore, the power source configuration of FIG. 22(B) is generally used, when a liquid crystal device is to be driven at a low duty ratio. The power source configuration shown in FIG. 22(C) has been proposed for driving a liquid crystal device at a high duty ratio, to solve the problem generated by the power source configuration of FIG. 22(B). This method is generally used to drive a liquid crystal device at a high duty ratio. The present invention is aimed at the power source configuration shown in FIG. 22(C), but its objectives and configuration are different from those of the prior-art method that is designed for the power source configuration shown in FIG. 22(B).

The present invention is devised to resolve the above described technical concerns, and has as its objective the provision of an inexpensive, less power-consumption power circuit, liquid crystal display device and electronic equipment.

SUMMARY OF THE INVENTION

In order to achieve the above described objectives, a first aspect of this invention relates to a power circuit for supplying to display elements a first group of drive voltages and a second group of drive voltages which has a voltage range that is non-overlapping and separate from the first group of drive voltages, based on a first power source supplying voltage levels including first and second voltage levels and a second power source supplying at least one voltage level including a third voltage level differing from the first and second voltage levels, comprising:

a supply circuit powered by the first power source, for supplying the first group of drive voltages, a voltage conversion circuit for converting the voltage levels of the first group of drive voltages supplied from the supply circuit and outputting the second group of drive voltages which are set with reference to the third voltage level, wherein the voltage conversion circuit comprises:

at least one voltage conversion capacitor, a first group of switches connected to the voltage conversion capacitor for turning on and off in order to charge the voltage conversion capacitor by the first group of drive voltages, and a second group of switches connected to the voltage conversion capacitor for turning on and off in order to discharge the voltage conversion capacitor and output the second group of drive voltages.

This aspect of the invention obtains the second group of drive voltages by converting the voltage levels of the first group of drive voltages. This first group of drive voltages is supplied by a supply circuit such as an impedance conversion circuit powered by the first power source. This means that the first and second groups of drive voltages having separate voltage ranges that do not overlap can be supplied from the first power source. As a result, the display elements can be driven by the minimum necessary power supplied from the first power source, even if for instance the voltage ranges of the first and second groups of drive voltages are further apart. Since the supply circuit is also driven by the first power source, it is possible to suppress wasteful power consumption in the supply circuit. Furthermore, since it is not longer necessary to ensure that the supply circuit can withstand high voltages, a low-withstand-voltage(low-break-down voltage) fabrication process can be used therefor.

With this aspect of the invention, the at least one voltage conversion capacitor is charged from the first power source through the supply circuit, by turning the first group of switches on and the second group of switches off. These voltage conversion capacitor is then discharged by turning the first group of switches off and the second group of switches on. The second group of drive voltages is output from the voltage conversion circuit, with the voltage levels thereof determined by the third voltage level and the charging voltages of the voltage conversion capacitor. This makes it possible for the power consumed by the second group of drive voltages to be supplied from the first power source.

It is not necessary to supply all of the first group of drive voltages from the supply circuit; the voltage level of the first power source may be used without modification as one of the first group of drive voltages. The supply circuit may also supply the first group of drive voltages through components such as resistors. In addition, a plurality of voltage levels of the first group of drive voltages may be converted in a voltage conversion circuit.

A second aspect of this invention relates to a power circuit for supplying to display elements a first group of drive voltages and a second group of drive voltages which has a voltage range that is non-overlapping and separate from the first group of drive voltages, based on a first power source supplying voltage levels including first and second voltage levels and a second power source supplying at least one voltage level including a third voltage level differing from the first and second voltage levels, comprising:

a first supply circuit powered by the first power source for supplying the first group of drive voltages, a voltage conversion circuit for converting voltage levels of the first power source and outputting a voltage level of a third power source which is set with reference to the third voltage level, and a second supply circuit powered by the third power source for supplying the second group of drive voltages, wherein the voltage conversion circuit comprises:

at least one voltage conversion capacitor;

a first group of switches connected to the voltage conversion capacitor for turning on and off in order to charge the voltage conversion capacitor by the first power source, and a second group of switches connected to the voltage conversion capacitor for turning on and off in order to discharge the voltage conversion capacitator and output the voltage level of the third power source.

This aspect of the invention supplies the voltage level of a third power source from the first power source via a voltage conversion circuit. The second supply circuit such as impedance conversion circuit is driven by this third power source, and supplies the second group of drive voltages. This means that, ultimately, the first and second groups of drive voltages can be supplied from the first power source. Moreover, since the first and second supply circuits are powered by the first power source, not only can power consumption in the first and second supply circuits be reduced, but also low-withstand-voltage components can be used in the first and second supply circuits.

A third aspect of this invention relates to a power circuit that further comprises a circuit for outputting at least one first divided voltage level for supplying the first group of drive voltages, using the first and second voltage levels of the first power source, and a circuit for outputting at least one second divided voltage level for supplying the second group of drive voltages, using the voltage level of the third power source and the third voltage level of the second power source.

With this aspect of the invention, a first divided voltage level is generated from the first and second voltage levels, and a second divided voltage level is generated from the voltage level of a third power source and a third voltage level of the second power source. Therefore, it is unnecessary to generate divided voltages between the voltage level of the first power source and that of the second power source. As a result, the current flowing between the first and the second power sources can be reduced, further reducing power consumption.

A fourth aspect of this invention further comprises a circuit for monitoring the third power source and halting the operation of at least one of the first and second groups of switches.

This aspect of the invention makes it possible to reduce problems such as power consumption due to the operation of the first and second groups of switches, by halting the operation of these first and second groups of switches when the currents charging and discharging the voltage conversion capacitor is small.

A fifth aspect of this invention further comprises a circuit for monitoring the third power source and supplying a current to the third power source from at least one of the first and second power sources.

This aspect of the invention enables some of the power to be supplied from the first and second power sources, when the power consumed by the supply circuit increases and the power supply from the voltage conversion capacitor is deficient. This enables an improvement in the power supply capability of the supply circuit.

A sixth aspect of this invention relates to a power circuit in which the voltage conversion capacitor and the first and second groups of switches are provided in sets for alternately turning on and off each of sets of the first groups of switches and each of sets of the second groups of switches, and for alternately charging and discharging each of sets of the voltage conversion capacitor.

This aspect of the invention enables current to be supplied through any groups among the sets of the second groups of switches which are on, when one of the second groups of switches is off. This makes it possible to increase the current obtained from the voltage conversion circuit.

A seventh aspect of this invention relates to a power circuit further comprising a circuit for lowering impedance between a voltage level included within the first power source and a voltage level included within the third power source, when a voltage difference between voltage levels included within the first power source drops.

This aspect of the invention makes it possible to lower the impedance between the first and third power sources, when the power source driving the power circuit is cut off, thus enabling a rapid drop in the output of the power circuit. This can protect the display elements.

An eighth aspect of this invention relates to a liquid crystal display device comprising the power circuit of this invention, a liquid crystal panel wherein liquid crystal elements are arranged in a matrix form, and a drive circuit for driving the liquid crystal panel, wherein the drive circuit drives the liquid crystal panel based on the first and second groups of drive voltages supplied from the power circuit.

With this aspect of the invention, if currents are made to flow between voltages within the first group of drive voltages or between voltages within the second group of drive voltages by the driving of the liquid crystal panel, these currents can be supplied from the first power source which outputs voltage levels with small voltage differences. This makes it possible to suppress wasteful power consumption to a minimum, when the first and second groups of drive voltages are separated due to an increased duty ratio in the liquid crystal display device. Therefore, it is possible to implement a liquid crystal display device with a low power consumption.

A ninth aspect of this invention relates to a liquid crystal display device in which the first power source is a logic-driving power source acting as a power source for the drive circuit.

This aspect of the invention makes it possible to use a logic-driving power source for generating a group of voltages for driving the liquid crystal device. Thus, it is possible to reduce the number of power sources supplied to the liquid crystal display device from the outside, further increasing the convenience of the liquid crystal display device.

A tenth aspect of this invention relates to an electronic equipment comprising the power circuit or liquid crystal display device of the present invention.

This aspect of the invention enables a reduction in the overall power consumption of the electronic equipment. If the power source used to drive the electronic equipment is used as the first power source, the configuration of the power circuitry of this electronic equipment can be further simplified.

BRIEF DESCRIPTION OF DRAWINGS

FIGS. 22(A), 22(B), and 22(C) are diagrams illustrating differences between the present invention and the prior-art method.

DETAILED DESCRIPTION OF THE PREFERRED EMBODIMENTS

Preferred embodiments of this invention are described below with reference to the accompanying figures.

Embodiment 1

Figure 1:
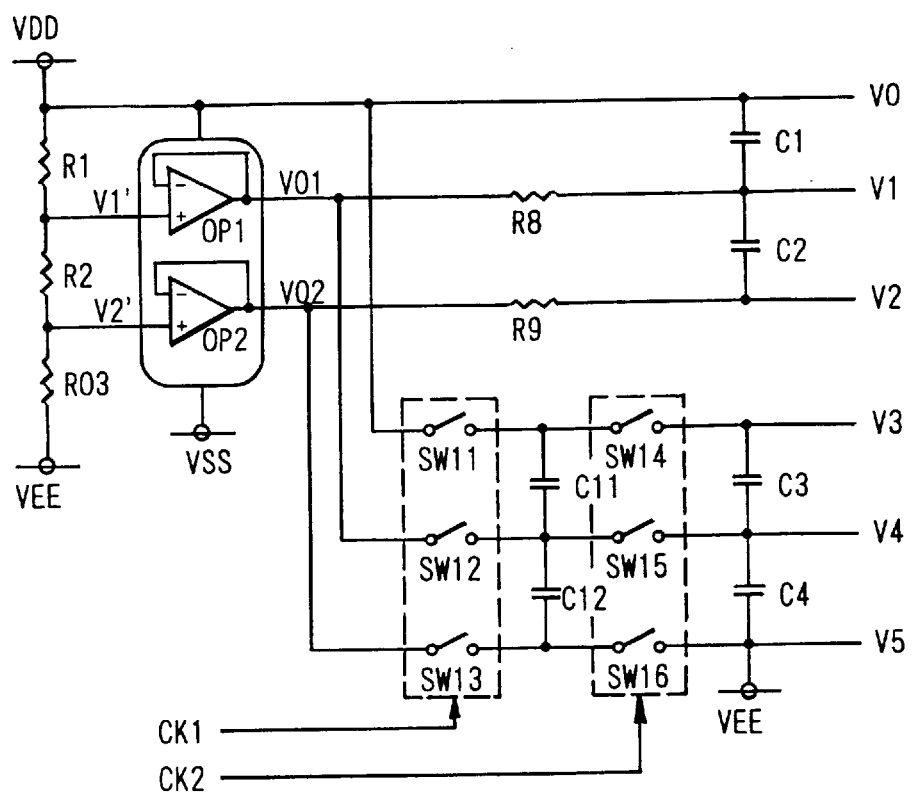
FIG. 1 shows an example of the configuration of a power circuit in accordance with a first embodiment.

FIG. 1 shows an example of the configuration of a power circuit in accordance with a first embodiment of this invention. This embodiment is applied to a multiplex driven liquid crystal display device. In this figure, VDD, VSS and VEE denote external power sources configured in such a manner that VDD> VSS> VEE. VDD and VSS are equivalent to the voltage levels of a first power source and VEE is equivalent to the voltage level of a second power source. These first and second power sources can supply other voltage levels. Resistors R1, R2 and R03 are connected in series between VDD and VEE to generate divided voltage levels V1' and V2' therebetween, as shown in FIG. 1. Note that FIG. 1 shows a configuration in which the voltage between VDD and VEE is divided by resistors, but the configuration may equally well be such that the voltage between VDD and VSS is divided thereby.

These divided voltage levels are input to operational amplifiers (impedance conversion circuits) OP1 and OP2 that are powered by VDD and VSS. Reduced impedance voltages V01 and V02 are output from OP1 and OP2 to become a first group of drive voltages V1 and V2, via resistors R8 and R9 that control the output currents of the operational amplifiers. The first power source VDD becomes V0, one of the first group of drive voltages. It should be noted, however, that it is not necessary for the voltage level of the first power source to be used without modification as one of the first group of drive voltages V0 to V2. Similarly, it is not necessary for the voltage level of the second power source to be used without modification as one of the second group of drive voltages V3 to V5.

In this embodiment, the operational amplifiers OP1 and OP2 and related circuitry function as current supply circuits.

Since the operational amplifiers OP1 and OP2 are powered by the first power sources VDD and VSS, the first group of drive voltages V0 to V2 are also powered by the first power source.

C11 and C12 denote voltage conversion capacitors. A plurality of voltage conversion capacitors may be provided by this invention. SW11 to SW13 denote a first group of switches, and SW14 to SW16 denote a second group of switches. Components C11, C12, SW11 to SW13, and SW14 to SW16 together comprise a voltage conversion circuit. Switches SW11 to SW13 are controlled by a signal CK1 and switches SW14 to SW16 are controlled by a signal CK2. Each of these switches SW11 to SW16 turns on when the corresponding signal goes high, and off when it goes low.

Note that the first and second groups of switches are controlled to turn on and off by electrical means in Embodiment 1. Nevertheless, they are not limited thereto and can, if necessary, be controlled by a method using mechanical components such as relays. C1 to C4 in FIG. 1 denote smoothing capacitors that controls voltage variations.

Figure 2:
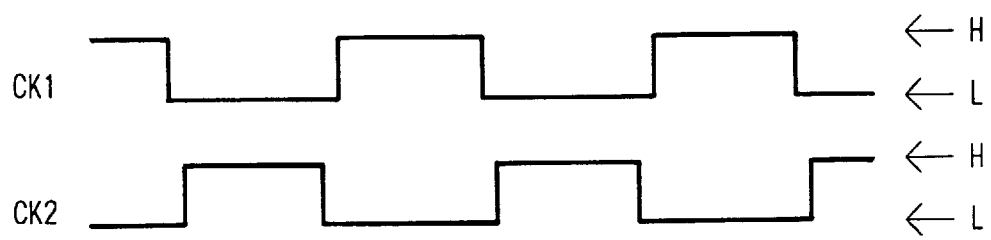
FIG. 2 shows signal waveforms of CK1 and CK2.

Waveforms of the signals CK1 and CK2 are shown in FIG. 2. CK1 and CK2 are shaped to be non-overlapping, to ensure that the first group of switches SW11 to SW13 and the second group of switches SW14 to SW16 are not turned on at the same time. In other words, CK2 is high when CK1 is low, and CK1 is high when CK2 is low. Further, CK2 rises after a constant time has elapsed after CK1 has fallen, and CK1 rises after a constant time has elapsed after CK2 has fallen.

During the period in which CK1 is high and CK2 is low, the switches SW11 to SW13 are turned on and the switches SW14 to SW16 are turned off. This causes the capacitors C11 and C12 to be charged by VDD, V01 and V02, and the voltages between VDD and V01 and between V01 and V02 are held at the connections between these capacitors. During the period in which CK1 is low and CK2 is high, the switches SW11 to SW13 are turned off and the switches SW14 to SW16 are turned on. This connects the lower end of the capacitor C12 to VEE, the upper end of the capacitors C11 and C12 output V3 and V4. When CK1 goes high and CK2 low, the switches SW14 to SW16 are off but the capacitors C11 and C12 do not output V3 and V4. Instead, the capacitors C3 and C4 hold the voltages V3 and V4. The rise and fall portions of the CK1 and CK2 waveforms shown in FIG. 2 are arranged to ensure that CK1 and CK2 are never high at the same time, to prevent any short-circuiting between the differing voltage levels shown in FIG. 1. Continuous repetition of the above operations enables the currents flowing from V3 and V4 to be continuously supplied from VDD, V01 and V02. This makes it possible for V3 and V4 to be used as power sources for driving the liquid crystal device.

The circuitry comprising the switches SW11 to SW13, capacitors C11 and C12, and switches SW14 to SW16 functions as a voltage conversion circuit in accordance with this invention. This voltage conversion circuit converts the voltage levels of the first group of drive voltages V0, V01 (equal to V1), and V02 (equal to V2) that are supplied from the circuitry comprising the operational amplifiers OP1 and OP2, and outputs the second group of drive voltages V3, V4 and V5 that are set with reference to VEE (third voltage level).

Note that in FIG. 1 the output terminal of OP1 is connected to the switch SW12 and the output terminal of OP2 is connected to the switch SW13. Nevertheless, the configuration may equally well be such that the output end of the resistor R8 is connected to the switch SW12, and the output end of the resistor R9 is connected to the switch SW13.

Figure 20:
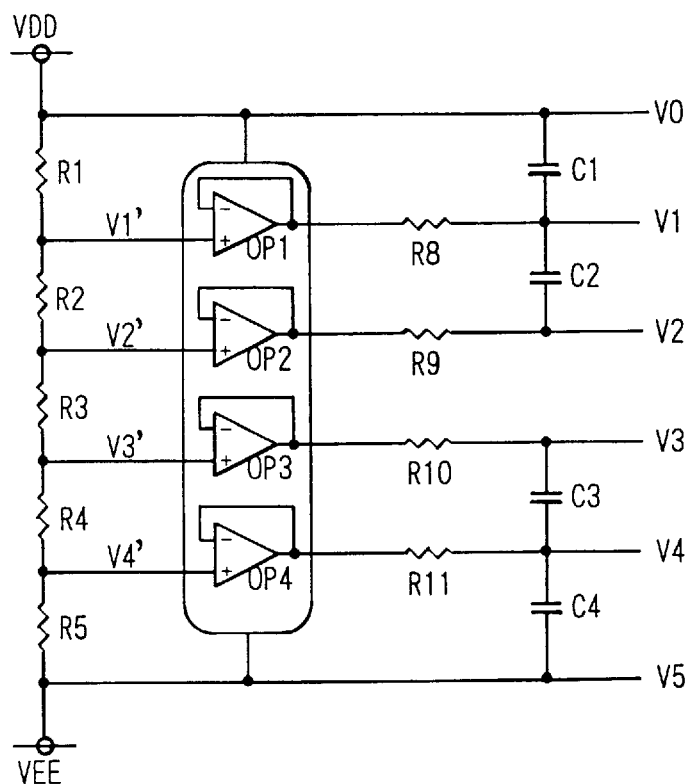
FIG. 20 shows a prior-art power circuit.
Figure 21:
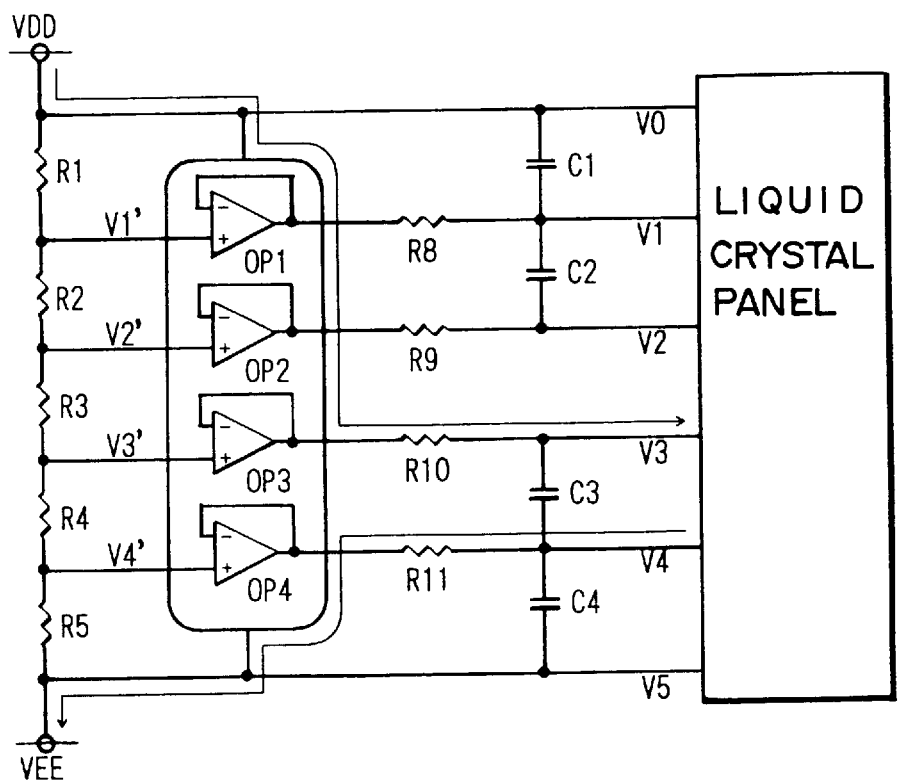
FIG. 21 is a diagram illustrative of currents flowing through the prior-art power circuit.

In the prior-art power circuit shown in FIG. 20, currents caused by the idling currents of the operational amplifiers and the switching of the voltage levels of the segment electrodes are supplied by VDD and VEE. However, in the power circuit of FIG. 1, all of these currents are supplied by VDD and VSS. This means that, when the circuit of FIG. 1 is used, the power consumption caused by these currents is (VDD−VSS)/(VDD−VEE) that of the prior art. In addition, the operational amplifiers of FIG. 1 need only withstand voltages of at least (VDD−VSS). This is less than the withstand voltage of (VDD−VEE) required of the operational amplifiers of FIG. 20. In other words, it is not necessary to use expensive high-withstand-voltage operational amplifiers with the circuit of FIG. 1. In addition, the circuit of FIG. 1 has the advantage of using only two operational amplifiers, in contrast to the four of the circuit of FIG. 20.

To give specific values for a liquid crystal display device of 320×480 dots (a duty ratio of 1/320): (VDD−VEE) is approximately 25 V and (V0−V2) and (V3−V5) are approximately 3.5 V. The power circuit of FIG. 1 is used and a logic-driving power source (5 V) for a liquid crystal display device is used as VDD and VSS. This enables a reduction in the power consumed by currents caused by the idling currents of the operational amplifiers and the switching of the voltage levels of the segment electrodes to approximately ⅕ that of the prior art. The withstand voltage of the operational amplifiers is also reduced to approximately ⅕ that of the prior art. Thus, the power circuit of FIG. 1 makes it possible to greatly ameliorate the previously described problems with the prior-art method.

Embodiment 2

Figure 3:
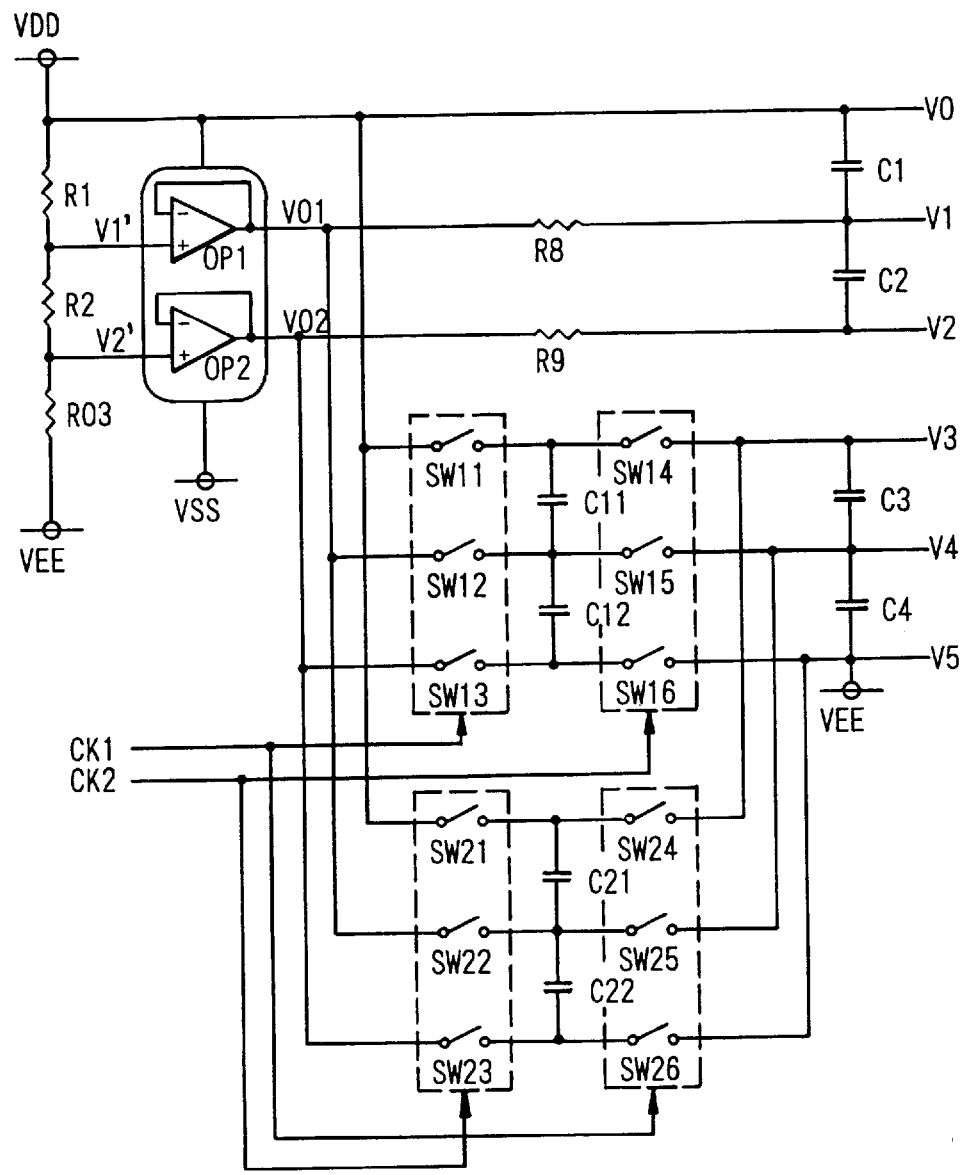
FIG. 3 shows an example of the configuration of a power circuit in accordance with a second embodiment.

An example of the configuration of a power circuit in accordance with a second embodiment of this invention is shown in FIG. 3. This embodiment differs from Embodiment 1 in that a plurality of sets of voltage conversion capacitors and first and second groups of switches are provided. Two sets are provided as an example in this case. In the same manner as in Embodiment 1, VDD and VSS denote voltage levels of a first power source, and VEE denotes a voltage level of a second power source. Similarly, V0 to V2 denote a first group of drive voltages, and V3 to V5 denote a second group of drive voltages. In the same manner as in Embodiment 1, the first power source VDD is used as V0, and the second power source VEE is used as V5.

Whereas Embodiment 1 has one voltage conversion capacitor C11, Embodiment 2 has two capacitators C11 and C21. Similarly, the one capacitor C12 of Embodiment 1 becomes two capacitors C12 and C22 in Embodiment 2. Two sets of the first group of switches SW11 to SW13 and SW21 to SW23, are provided in Embodiment 2, corresponding to the voltage conversion capacitors. Similarly, two sets of the second group of switches SW14 to SW16 and SW24 to SW26 are also provided in Embodiment 2, In this manner, a plurality of sets of voltage conversion capacitors and first and second groups of switches can be provided by this invention.

The switches SW11 to SW13 and SW24 to SW26 are controlled by the signal CK1, and the switches SW14 to SW16 and SW21 to SW23 are controlled by the signal CK2. Each of the switches SW11 to SW16 and SW21 to SW26 is on, when the corresponding controlling signal (CK1 or CK2) is high, and off when it is low. C1 to C4 denote smoothing capacitors that control variations in voltages V1 to V4.

The waveform signals shown in FIG. 2 are applied in Embodiment 2 as the signals CK1 and CK2. During the period in which CK1 is high and CK2 is low, the capacitors C11 and C12 are charged by VDD, V01, and V02. Voltages V3 and V4 are output from the upper ends of the capacitors C21 and C22 (which are not connected to VEE). During the period in which CK1 is low and CK2 is high, capacitors C21 and C22 are charged by VDD, V01, and V02. Voltages V3 and V4 are output from the upper ends of the capacitors C11 and C12.

In Embodiment 1, the switches SW14 to SW16 are off during the period in which CK1 is high and CK2 is low, so that the voltages V3 and V4 are not output from the capacitors C11 and C12. In other words, the voltages held at the capacitors C3 and C4 are output during this period. In contrast thereto, since the switches SW24 to SW26 of Embodiment 2 are on during the period in which CK1 is high and CK2 is low, V3 and V4 are output from the capacitors C21 and C22. This means that the number of times that currents are supplied from VDD, V01, and V02 in Embodiment 2 is twice that in Embodiment 1. Thus current can be extracted more often from V3 and V4 than in Embodiment 1. In this manner, Embodiment 2 has a further advantage over Embodiment 1 in that a larger current can be obtained.

Embodiment 3

Figure 4:
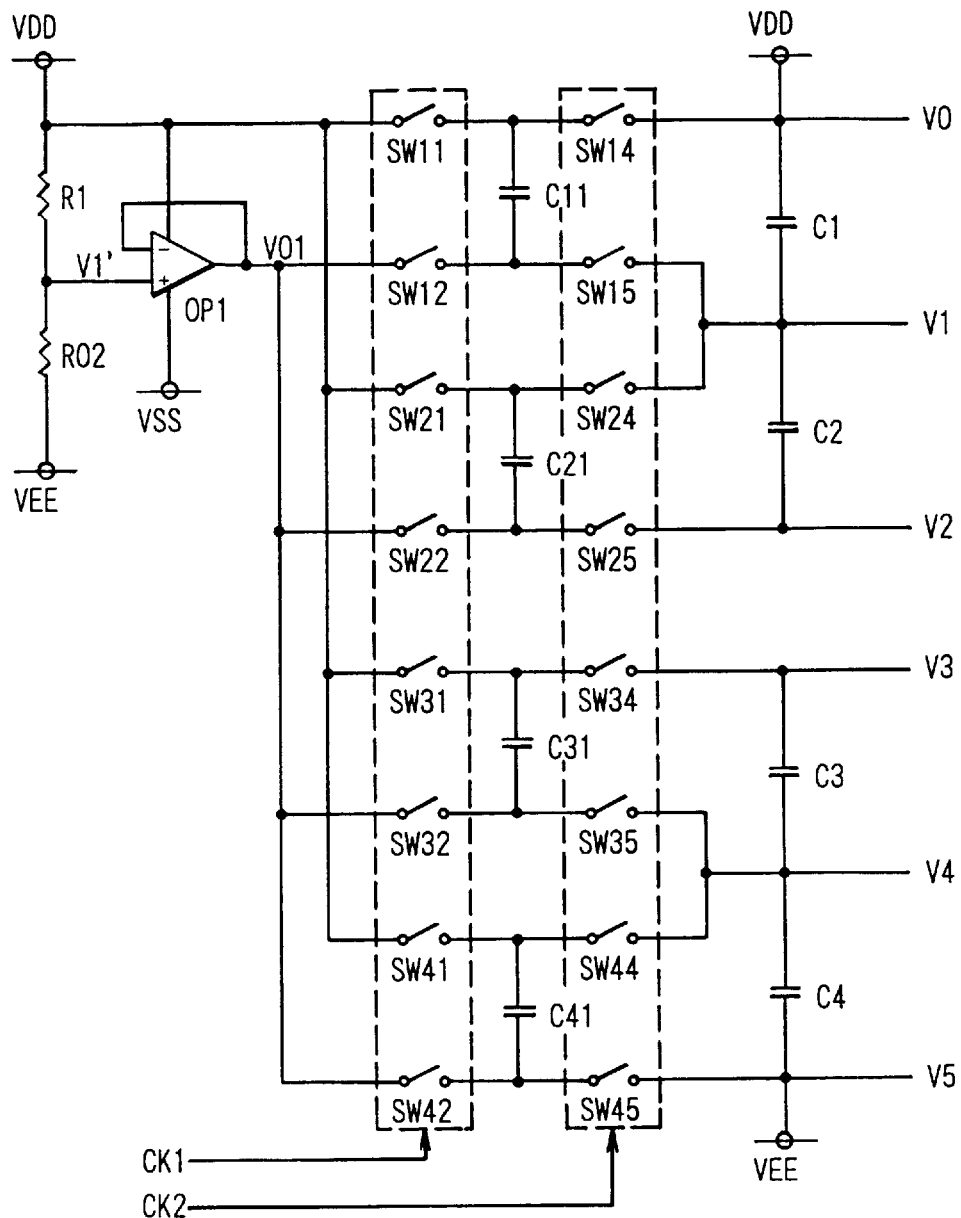
FIG. 4 shows an example of the configuration of a power circuit in accordance with a third embodiment.

An example of the configuration of a power circuit in accordance with a third embodiment of this invention is shown in FIG. 4. In this figure, VDD, VSS, and VEE are supplied from external power sources, in the same manner as in Embodiments 1 and 2. In Embodiment 3, resistors R1 and R02 are connected in series between VDD and VEE to generate a divided voltage level V1'. The impedance of this voltage level V1' is lowered by an operational amplifier OP1 that is powered by the power sources VDD and VSS, to generate a voltage V01. Embodiment 3 is provided with a voltage conversion circuit comprising components SW11, SW12, SW21, SW22, C11, C21, SW14, SW15, SW24 and SW25. This voltage conversion circuit converts the voltage levels of VDD and V01 to output a first group of drive voltages V0 to V2. In this case, since the operational amplifier OP1 is powered by the first power sources VDD and VSS, the first group of drive voltages V0 to V2 is supplied from the first power sources VDD and VSS. Embodiment 3 is also provided with a voltage conversion circuit comprising components SW31, SW32, SW41, SW42, C31, C41, SW34, SW35, SW44 and SW45. This voltage conversion circuit converts the voltage levels of VDD and V01 to output a second group of drive voltages V3 to V5 that are set with reference to VEE. In this case, since the operational amplifier OP1 is powered by the first power sources VDD and VSS, the second group of drive voltages V3 to V5 is supplied from the first power sources VDD and VSS. The switches SW11, SW12, SW21, SW22, SW31, SW32, SW41 and SW42 in FIG. 4 are controlled by the signal CK1, and the switches SW14, SW15, SW24, SW25, SW34, SW35, SW44 and SW45 are controlled by the signal CK2. The method used to control these switches is the same as that of Embodiments 1 and 2. C1 to C4 denote smoothing capacitors that control variations in voltages V1 to V4.

The waveform signals shown in FIG. 2 are also applied in Embodiment 3 as the signals CK1 and CK2. During the period in which CK1 is high and CK2 is low, the capacitors C11, C21, C31, and C41 are charged by VDD and V01. During the period in which CK1 is low and CK2 is high, one end of the capacitor C11 is connected to the power source VDD and the other end outputs V1, and one end of the capacitor C21 is connected to V1 and the other end outputs V2. One end of the capacitor C41 is connected to the power source VEE, and the other end outputs V4, and one end of the capacitor C31 is connected to V4 and the other end outputs V3.

In Embodiments 1 and 2, it is necessary for the operational amplifiers OP1 and OP2 to output the voltage levels V01 and V02. This means that it is not possible for VSS, which is used as a power source for these operational amplifiers, to be at a voltage level higher than that of V02. In contrast thereto, the operational amplifier OP1 of Embodiment 3 can output the voltage level V01, as shown in FIG. 4. Thus, VSS which is used as a power source for this is operational amplifier, can be at a voltage level lower than that of V01. In other words, Embodiment 3 enables the voltage between VDD and VSS to be less than that between VDD and VSS in Embodiments 1 and 2. Therefore, it is possible to reduce power consumption due to currents caused by the idling currents of the operational amplifiers and the switching of the voltage levels of the segment electrodes to less than that in Embodiments 1 and 2. Embodiments 1 and 2 also have resistors for generating divided voltages connected between VDD and VEE. In contrast thereto, Embodiment 3 enables these resistors to be connected between VDD and VSS. Therefore, the power consumed by this resistor section is less than that consumed by Embodiments 1 and 2.

In Embodiment 3 of this invention, it is assumed that V1 and V2 may be obtained by the same configuration and mode of operation as a charge-pump circuit, based on the voltage level VDD. Similarly V1 and V2 may be obtained by the same configuration and mode of operation as a general-purpose voltage-increasing circuit known as a switched capacitor circuit, based on the voltage level V01. However, the voltage between V1 and V3 is generally at least ten times the voltage between V0 and V1, and large numbers of capacitors and switches are required for obtaining V3, V4, and V5 by a charge-pump circuit, making this method impractical. In contrast thereto, this embodiment sets the second group of drive voltages V3 to V5 with reference to VEE, making it unnecessary to provide a charge-pump operation using large numbers of components. Power is supplied from the first power sources VDD and VSS, while the second group of drive voltages is set with reference to VEE. Therefore, this embodiment has the advantage of preventing waste of power.

Embodiment 4

Figure 5:
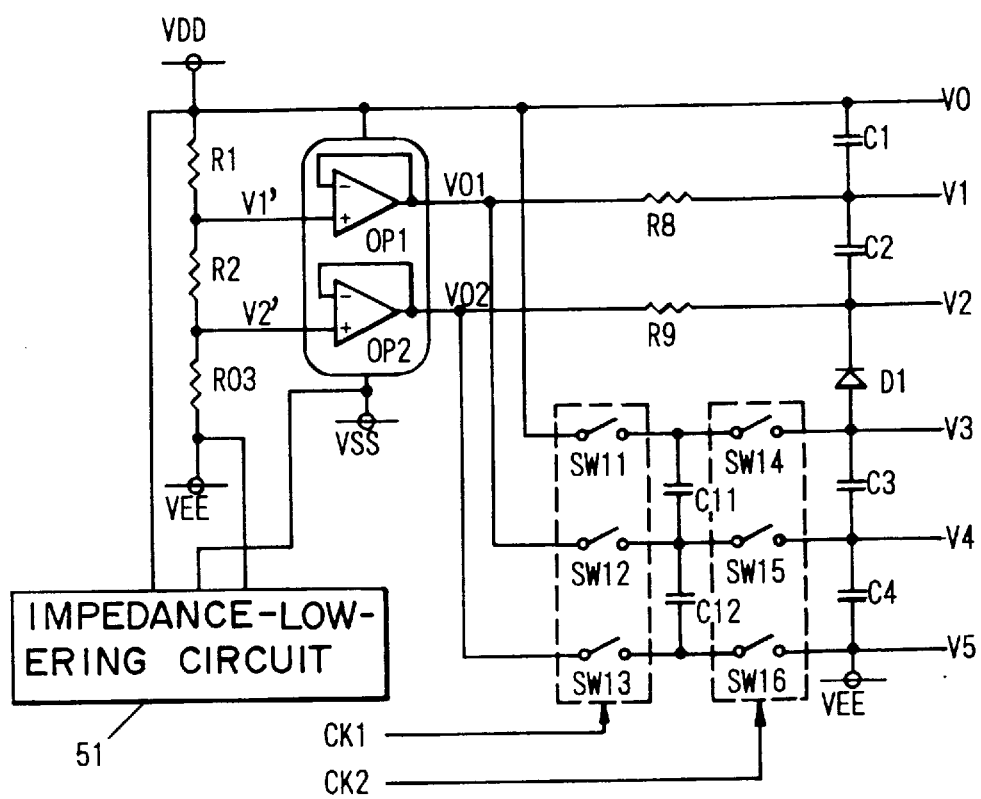
FIG. 5 shows an example of the configuration of a power circuit in accordance with a fourth embodiment.

An example of the configuration of a power circuit in accordance with a fourth embodiment of this invention is shown in FIG. 5. This embodiment differs from Embodiment 1 in that an impedance-lowering circuit 51 is added to lower the impedance between VDD and VEE, when the voltage between VDD and VSS drops. A diode D1 in FIG. 5 is intended to prevent any inversion in the voltage levels of V2 and V3, when there is a reduced impedance between VDD and VEE.

Figure 6:
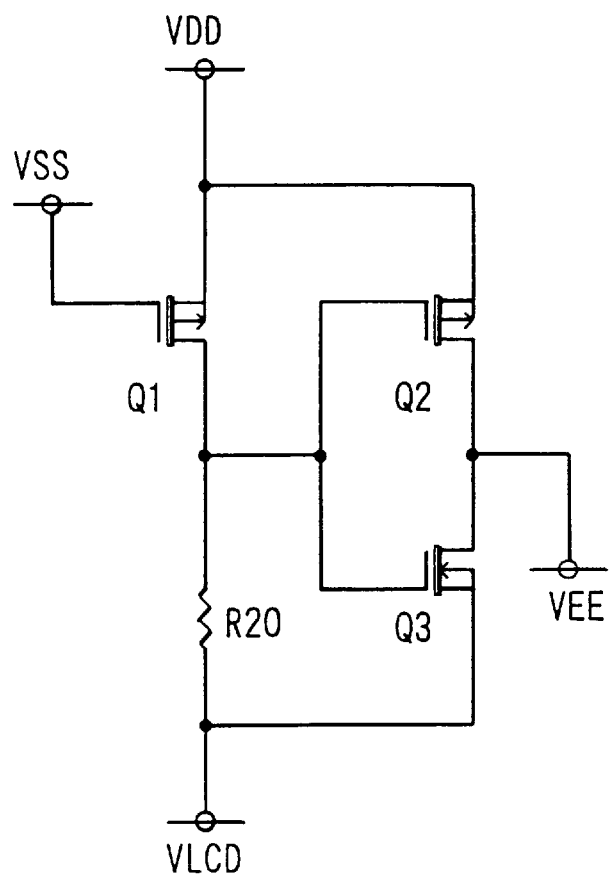
FIG. 6 shows an example of the configuration of an impedance-lowering circuit.

An example of the impedance-lowering circuit 51 is shown in FIG. 6. In this figure, VLCD denotes an external power source for powering the impedance-lowering circuit 51. If the voltage between VDD and VSS is greater than the threshold voltage of a MOS field-effect transistor Q1, MOS field-effect transistors Q1 and Q3 turn on and another MOS field-effect transistor Q2 turns off. This sets the voltage level of VEE to VLCD. On the other hand, if the voltage between VDD and VSS is smaller than the threshold voltage of Q1, Q2 turns on and Q1 and Q3 turn off. This lowers the impedance between VEE and VDD and sets the voltage level of VEE to VDD. Note that R20 in FIG. 6 denotes a resistor for limiting the current flowing through Q1. Since either one of Q2 and Q3 is always off, the power consumption of the circuit of FIG. 6 can be held low by making the resistance of R20 large.

The power circuit of this invention differs from the prior-art circuit of FIG. 20 in that operational amplifiers are not connected between VDD and VEE. Therefore, extremely high impedances are formed between VDD and VEE and between V0 and V5. To stabilize voltage levels, it is common to insert a large-capacitance capacitor at an appropriate position, such as between the external power sources VSS and VEE or VDD and VSS. If an external power source fails when such a power circuit powered by external power sources is used to drive a liquid crystal device, the power source VEE will float. This lengthens the time required for the voltage level of VEE to fall to close to the voltage level of VDD or VSS. Consequently, this also lengthens the time required for the voltage levels of V3 and V4 to fall. Thus, a DC voltage is liable to be applied to the liquid crystal for a long time, when an external power source fails. In order to prevent this problem, therefore, it is necessary to make the voltage levels of VEE (V5), V3, and V4 fall rapidly close to V0. Thus, the impedances between VDD and VEE and between V3 or V4 and VDD need to be lowered as soon as the external power source fails.

In the circuit of FIG. 5, a lowering of a voltage between any pair within VDD, V01, and V02 is caused by a lowering of the power source voltage of the operational amplifiers OP1 and OP2. In this particular case, the impedance-lowering circuit 51 checks the voltage between VDD and VSS. When this voltage becomes less than the threshold voltage of Q1, the impedance between VDD which is the voltage level of the first power source and VEE which is the voltage level of the second power source is also lowered. If the voltage level of VEE becomes close to VDD in the circuit of FIG. 5, the voltage levels of V3 and V4 automatically become close to VDD. Therefore, it is not necessary to add any special circuitry for V3 and V4.

The impedance-lowering circuit 51 shown in FIG. 6 uses MOS field-effect transistors to check for any lowering in the voltage level of the first power source. However, the impedance-lowering circuit 51 is not necessarily limited to the above described configuration. For example, the impedance between VSS and VEE may be adjusted by sending a control signal to the impedance-lowering circuit 51 from outside the device.

The above described Embodiment 4 solves the problem of the time taken for the voltage level of the second power source to fall when the external power source is cut off, enabling the liquid crystal device to be driven more stably.

Embodiment 5

Figure 7:
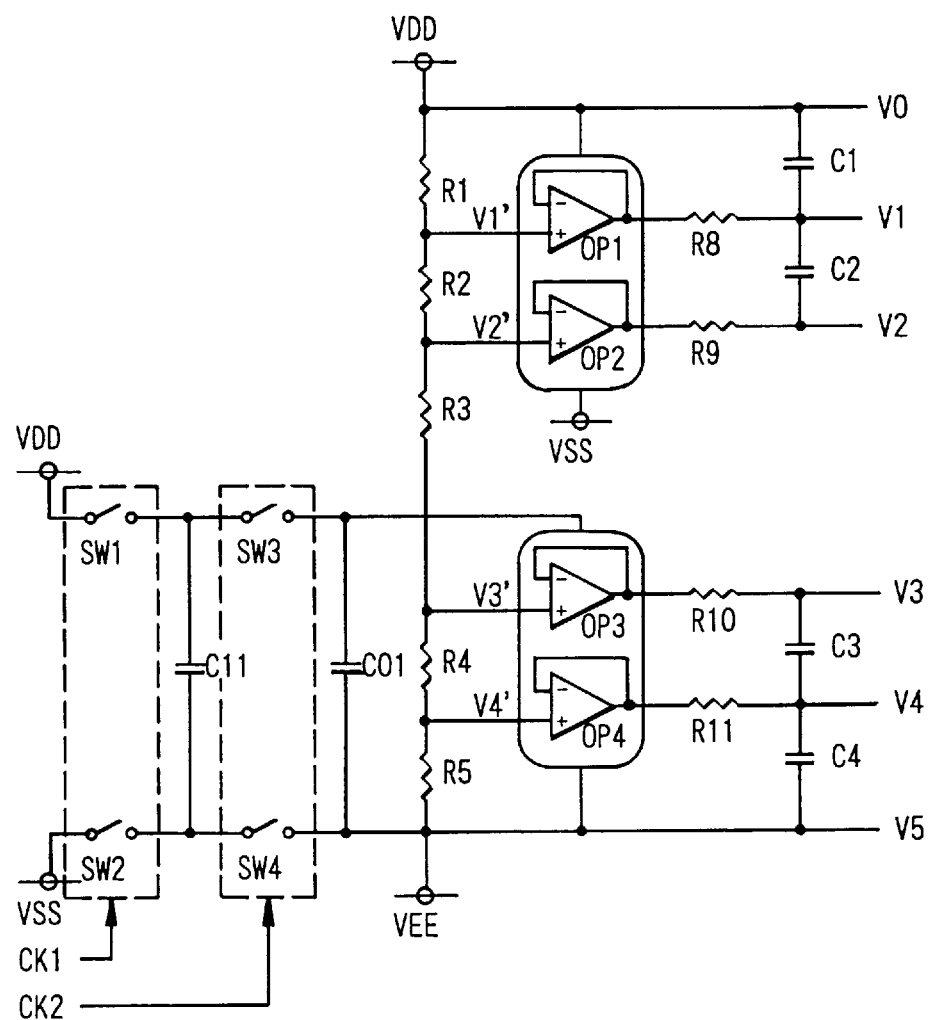
FIG. 7 shows an example of the configuration of a power circuit in accordance with a fifth embodiment.

An example of the configuration of a power circuit in accordance with a fifth embodiment of this invention is shown in FIG. 7. The main difference between this embodiment and the prior-art circuit shown in FIG. 20 lies in the power sources of the operational amplifiers OP1 to OP4. In FIG. 7, VDD and VSS denote voltage levels of a first power source, VEE denotes a voltage level of a second power source, and Vo denotes a voltage level of a third power source. Further, C11 denotes a voltage conversion capacitor, SW1 and SW2 denote a first group of switches, and SW3 and SW4 denote a second group of switches. The switches SW1 and SW2 are controlled by a signal CK1 and the switches SW3 and SW4 are controlled by a signal CK2.

Operational amplifiers OP1 and OP2 each of which are connected in a voltage-follower configuration, function as a first supply circuit. Since the operational amplifiers OP1 and OP2 are powered by the first power source VDD and VSS, the first group of drive voltages V0 to V2 are powered from these first power source.

The circuit comprising components SW1, SW2, C11, SW3, and SW4 functions as a voltage conversion circuit. This voltage conversion circuit converts the voltage levels VDD and VSS of the first power source and outputs the voltage level Vo of the third power source that is set with reference to VEE (the third voltage level).

Operational amplifiers OP3 and OP4 each of which are connected in a voltage-follower configuration, function as a second supply circuit. These operational amplifiers OP3 and OP4 are powered by Vo and VEE to convert voltages in a one-to-one relationship, and also convert impedances for supplying the second group of drive voltages V3 to V5.

It should be noted, however, that first and second supply circuits are not limited to operational amplifiers connected in voltage-follower configurations. Other circuits using operational amplifiers or circuits using means such as bipolar transistors or field-effect transistors may be used. C01 denotes a capacitor for holding the power source voltage supplied to the operational amplifiers OP3 and OP4.

The waveform signals shown in FIG. 2 are also applied in Embodiment 5 as the signals CK1 and CK2. During the period in which CK1 is high and CK2 is low, SW1 and SW2 are on and the capacitor C11 is charged by the power sources VDD and VSS. During the period in which CK1 is low and CK2 is high, SW3 and SW4 are on, one end of C11 is connected to VEE, and the other end thereof outputs a voltage Vo that is (VEE +VDD−VSS). The voltage level of Vo is held by C01. In other words, the voltage level of Vo is held substantially constant, even when the signal CK1 next goes high and CK2 low. This configuration ensures that the operational amplifiers OP3 and OP4 operate on a voltage that is (VDD−VSS). Thus the power consumed by OP3 and OP4 is supplied from the first power sources VDD and VSS, in the same manner as in Embodiment 1.

Currents caused by the idling currents of the operational amplifiers and the switching of the voltage levels of the segment electrodes are supplied from VDD and VEE in the prior-art circuit of FIG. 20. In contrast, these currents are supplied from VDD and VSS in this embodiment. Therefore, the power consumption caused by such currents is greatly reduced. In addition, the operational amplifiers of this embodiment need only withstand voltages of at least (VDD−VSS), which is less than the withstand voltage of (VDD−VEE) required of the operational amplifiers used in the prior-art circuit of FIG. 20. Thus, it is not necessary to use expensive high-withstand-voltage operational amplifiers in this embodiment. Since the first group of drive voltages V0 to V2 and the second group of drive voltages V3 to V5 are stabilized by the operational amplifiers in the same manner as in the prior-art circuit, so the stability of voltages V0 to V5 is the same as that of the prior-art circuit.

Embodiment 6

Figure 8:
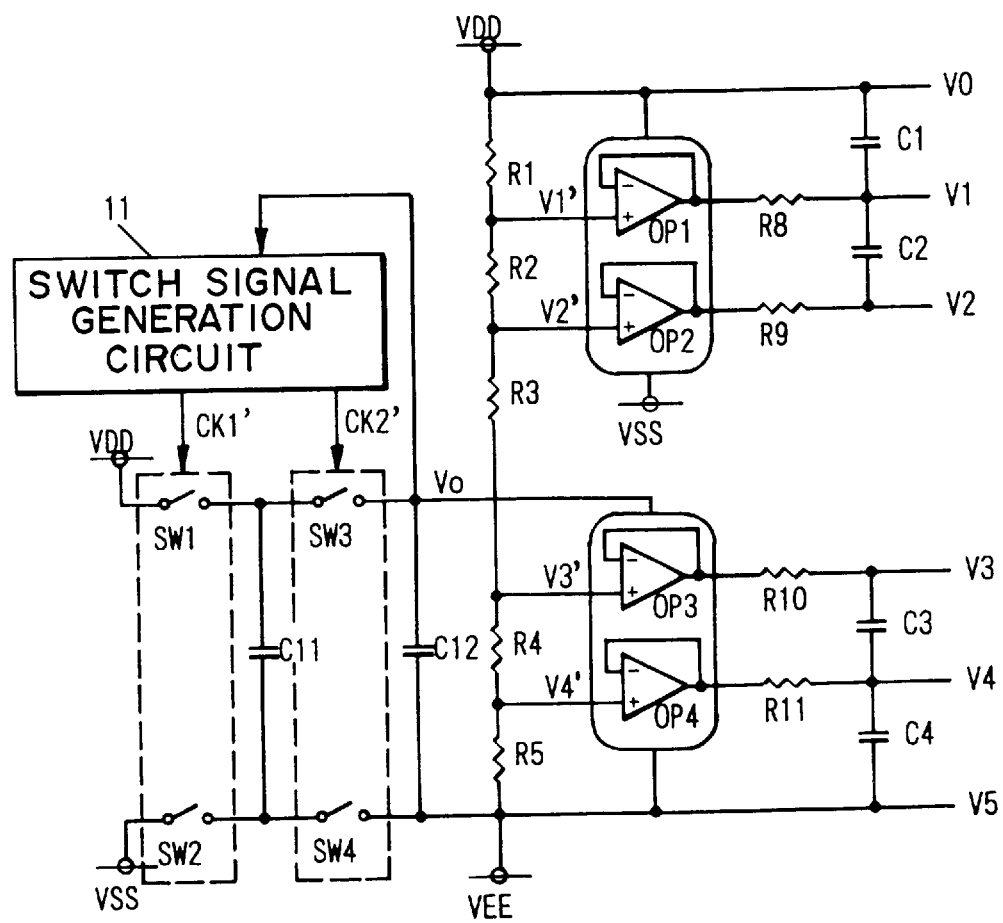
FIG. 8 shows an example of the configuration of a power circuit in accordance with a sixth embodiment.

An example of the configuration of a power circuit in accordance with a sixth embodiment of this invention is shown in FIG. 8. This embodiment differs from Embodiment 5 in that a switch signal generation circuit 11 is added thereto. The switch signal generation circuit 11 monitors the voltage level Vo of the third power source, and stops the operation of at least one of the first group of switches SW1 and SW2 and the second group of switches SW3 and SW4, depending on the voltage level of Vo.

The operation of the switch signal generation circuit 11 will now be described in detail.

The switch signal generation circuit 11 monitors the voltage level of Vo. If the voltage level of Vo falls to a certain reference voltage level (hereinafter referred to as Vr1), the circuit 11 outputs the waveform signals CK1 and CK2 shown in FIG. 2 as signals CK1' and CK2', rising the voltage level of Vo. On the other hand, if the voltage level of Vo is at least as high as the reference voltage level Vr1, the circuit 11 holds both signals CK1' and CK2' low and halts the operation of the switches SW1 to SW4. In this case, the voltage level of Vo is set to be at least as high as a voltage level that enables the operational amplifiers OP3 and OP4 to operate. The voltage level of Vo is held by a capacitor C12, when the switches SW3 and SW4 are off. When there is virtually no necessity for current to flow through the operational amplifiers OP3 and OP4, the voltage level of Vo is mostly in a state such that Vo is greater than Vr1 and thus the switches SW1 to SW4 hardly operate at all. On the other hand, when it is necessary for large currents to flow through the operational amplifiers OP3 and OP4, the time during which Vo is greater than Vr1 is short and thus the number of times that SW1 to SW4 operate per unit time is increased. If the reference voltage level Vr1 is set to at least a voltage level at which the operational amplifiers OP3 and OP4 are able to operate, the switches SW1 to SW4 operate for the minimum number of times necessary for supplying current to the operational amplifiers OP3 and OP4 from the power sources VDD and VSS. This makes it possible to reduce the power required for operating the switches SW1 to SW4.

Figure 9:
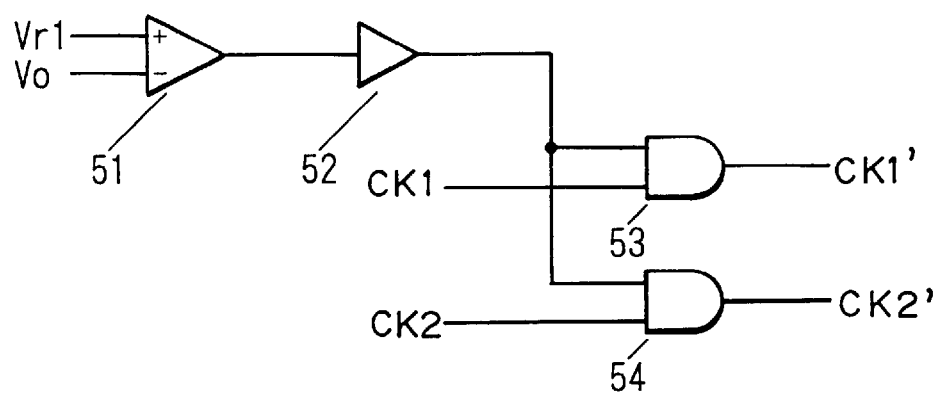
FIG. 9 shows an example of the configuration of a switch signal generation circuit.

The switch signal generation circuit 11 may be implemented by a circuit as shown in FIG. 9, for example. In this figure, a comparator 51 compares the voltage level of Vo with the reference voltage level Vr1. The reference voltage level Vr1 may be obtained by dividing the voltage between power sources VDD and VEE by resistors, or by using means such as Zener diodes or a suitable voltage level within FIG. 8. A level shifter 52 convert an output from the comparator 51 into a logical voltage. The waveform signals shown in FIG. 2 are input to signal lines CK1 and CK2 . An output of the level shifter 52 is high when Vo is less than Vr1, and is low when Vo is greater than Vr1. Therefore, the waveform signals CK1 and CK2 shown in FIG. 2 are output as output signals CK1' and CK2' of AND gates 53 and 54, when Vo is less than Vr1. Otherwise, CK1' and CK2' are low when Vo is greater than Vr1.

In Embodiment 6, the voltage level of Vo varies, when SW1 to SW4 are halted. However, since Vo is controlled to ensure that it does not fall below the voltage level at which the operational amplifiers OP3 and OP4 can operate, the operation of the operational amplifiers OP3 and OP4 ensures that the voltage levels of V3 and V4 are virtually unchanged. Therefore, the degradation of display quality that occurs with the prior-art power circuit does not occur.

Embodiment 7

Figure 10:
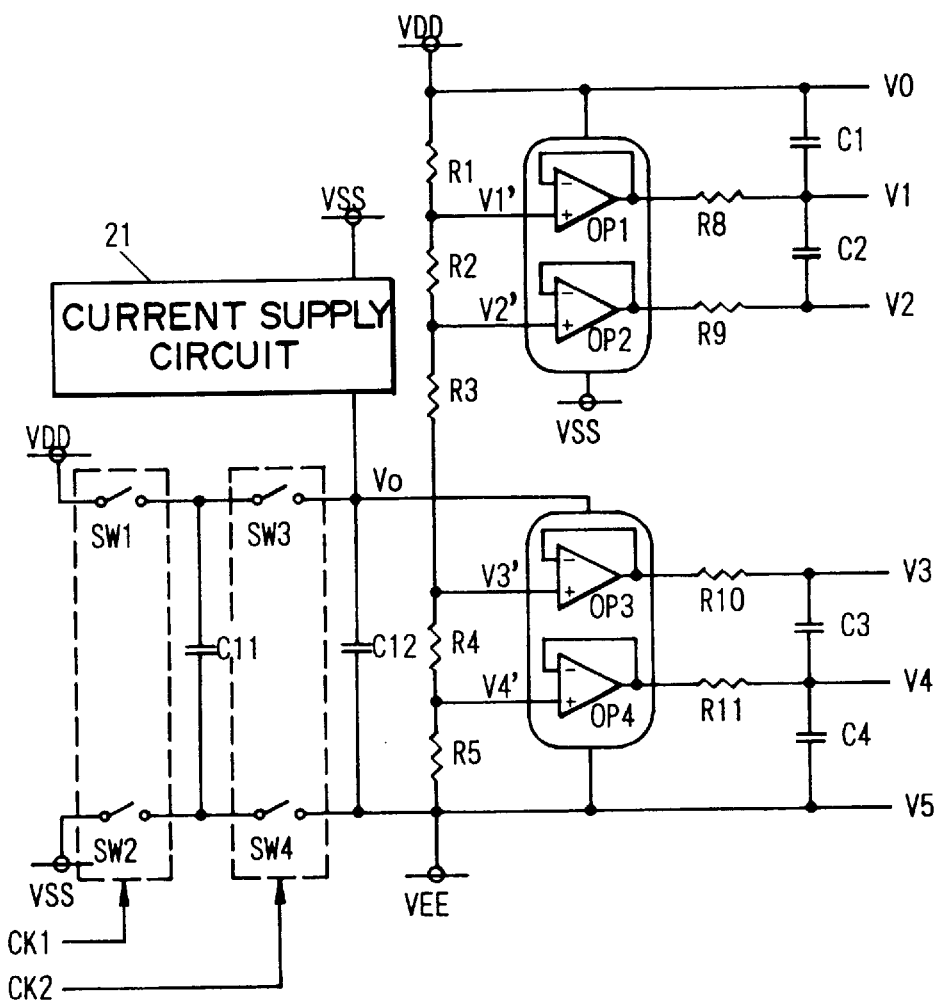
FIG. 10 shows an example of the configuration of a power circuit in accordance with a seventh embodiment.

An example of the configuration of a power circuit in accordance with a seventh embodiment of this invention is shown in FIG. 10. This embodiment differs from Embodiment 5 in that a current supply circuit 21 is added thereto. The switches SW1 to SW4 operate in the same manner as in Embodiment 1. However, the waveform signals shown in FIG. 2 may be used as the signals CK1 and CK2. Alternatively, the signals CK1' and CK2' output from the switch signal generation circuit 11 of FIG. 8 may be used. Note that C12 denotes a capacitor for holding a voltage between Vo and VEE.

The current supply circuit 21 monitors the voltage level of Vo which is the third power source, and supply current from at least one of the first and second power sources (in FIG. 10, it is VSS) to the third power source Vo.

The operation of the current supply circuit 21 will now be described in detail.

The current supply circuit 21 monitors the voltage level of Vo. If the voltage level of Vo falls to a certain reference voltage level (hereinafter referred to as Vr2), the circuit 21 passes a current from the power source VSS to Vo, thus rising Vo. On the other hand, if the voltage level of Vo is at least as high as the reference voltage level Vr2, the circuit 21 cuts the connection between the power source VSS and Vo. The reference voltage level Vr2 is set to be at least as high as a voltage level that enables the operational amplifiers OP3 and OP4 to operate. When there is not much necessity for current to flow through the operational amplifiers OP3 and OP4, the operation of the switches SW1 to SW4 and capacitor C11 ensures that current that would be consumed by the operational amplifiers OP3 and OP4 is supplied from the power sources VDD and VSS. At this point, the current supply circuit 21 does nothing in particular. When it is necessary for large currents to flow through the operational amplifiers OP3 and OP4, the voltage level of Vo drops until Vo is less than Vr2 if the switches SW1 to SW4 and the capacitor C11 ensure that these currents are no longer supplied from the power sources VDD and VSS. In this case, the current supply circuit 21 supplies current to Vo from the power source VSS, thus ensuring a voltage that enables the operational amplifiers OP3 and OP4 to operate. It should be noted, however, that some of the current to the operational amplifiers OP3 and OP4 is supplied from the power sources VDD and VSS, even when the current supply circuit 21 is operating.

Figure 11:
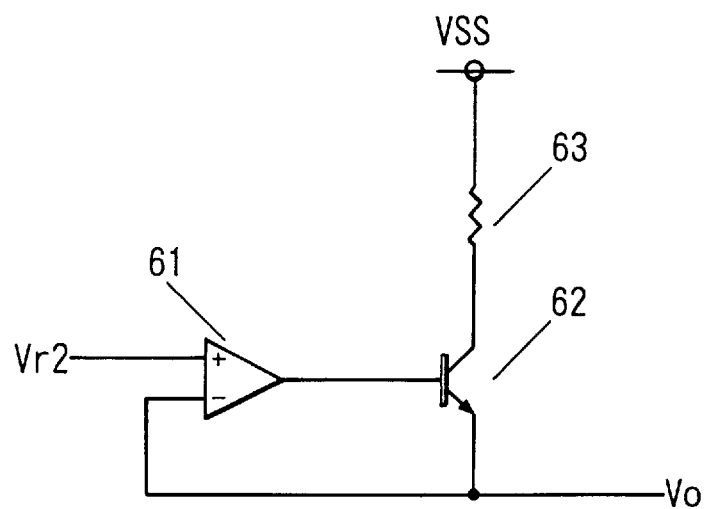
FIG. 11 shows an example of the configuration of a current supply circuit.

This current supply circuit 21 may be implemented by a circuit as shown in FIG. 11, for example. In this figure, a comparator 61 compares the voltage level of Vo with the reference voltage level Vr2, which is obtained by a suitable method. A resistor 63 is intended to protect a transistor 62.

The transistor 62 turns on when Vo is less than Vr2 to pass a current from the power source VSS to Vo, and turns off when Vo is greater than Vr2 to cut the connection between the power source VSS and Vo.

With Embodiment 7, the voltage level of Vo varies, but the voltage levels V3 and V4 hardly vary at all, owing to the actions of the operational amplifiers OP3 and OP4. Therefore, the degradation of display quality that is prevalent with the prior-art power circuit does not occur.

Consider the use of the power circuit of Embodiment 7 to drive a liquid crystal display device that is as large as a panel. Panel currents increase with the size of the liquid crystal panel. However, a typical display such as that of character patterns does not require segment panel currents that are very large. Thus current is supplied from the power sources VDD and VSS to the operational amplifiers OP3 and OP4, in the same manner as the other embodiments of this invention, enabling further reductions in power consumption. Now consider a case in which a special pattern that requires an extremely large segment panel current is displayed, where the current required for the operational amplifiers OP3 and OP4 can no longer be supplied from the power sources VDD and VSS by the operation of the switches SW1 to SW4 and the capacitor C11. In this case, the operational amplifiers OP3 and OP4 can operate as normal and output suitable voltage levels for V3 and V4 by supplying the shortfall of current from the power sources VSS and VEE. In other words, Embodiment 7 enables stable output of the voltage levels V1 to V4 over all of the conditions that the liquid crystal display device will meet in use, while keeping the capabilities of components such as the switches SW1 to SW4 and the capacitor C11 unchanged at a low level. Also, embodiment 7 enables a reduction in power consumption under conditions that the liquid crystal display device will meet in normal use.

Embodiment 8

Figure 12:
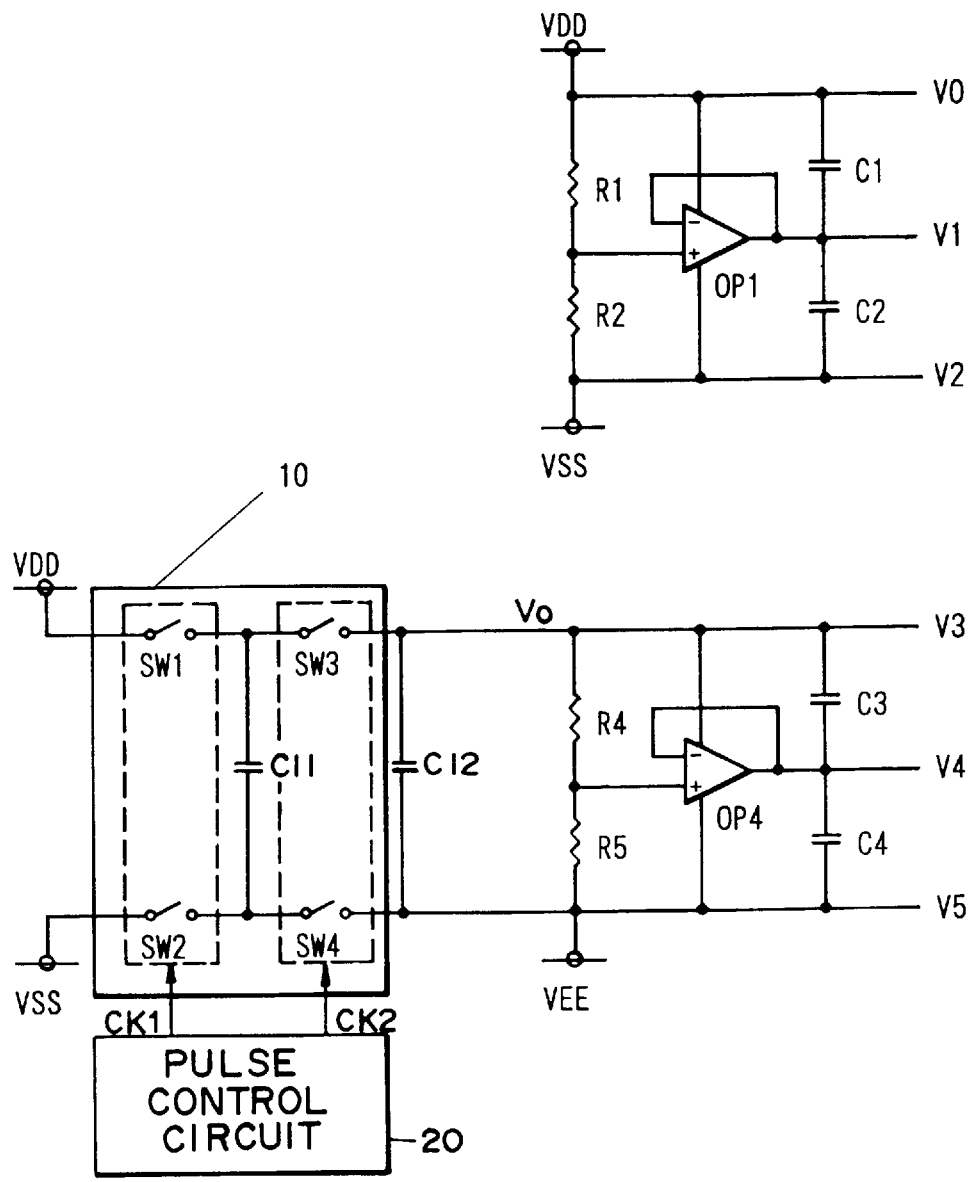
FIG. 12 shows an example of the configuration of a power circuit in accordance with an eighth embodiment.

An example of the configuration of a power circuit in accordance with an eighth embodiment of this invention is shown in FIG. 12. In this figure, VDD and VSS denote voltage levels of a first power source, VEE denotes a voltage level of a second power source, and Vo denotes a voltage level of a third power source. Further, C11 denotes a voltage conversion capacitor, SW1 and SW2 denote a first group of switches, and SW3 and SW4 denote a second group of switches. The switches SW1 to SW4 are controlled by signals CK1 and CK2 that are output from a pulse control circuit 20.

In Embodiment 8, the operational amplifier OP1 and related components function as a first supply circuit. Since the operational amplifier OP1 is powered by the first power sources VDD and VSS, the first group of drive voltages V0 to V2 are supplied with power from the first power sources. This embodiment differs from Embodiment 1 in that the voltage between the first power sources VDD and VSS is divided by resistors R1 and R2 and input to the operational amplifier OP1. This divided voltage level is subjected to impedance conversion by the operational amplifier OP1, and is output as V1. It should be noted, however, that OP1 need not be provided and this divided voltage level can be output without modification as V1. FIG. 12 also indicates that the first power sources VDD and VSS are used without modification as V0 and V2, but it is not necessary to limit this embodiment of the invention thereto. Note that C1 and C2 denote voltage smoothing capacitors.

A voltage conversion circuit 10 comprises the components SW1, SW2, C11, SW3 and SW4, and converts the voltage levels VDD and VSS of the first power source, then outputs the voltage level Vo of the third power source that is set with reference to VEE (the third voltage level).

In Embodiment 8, the operational amplifier OP4 and related components function as a second supply circuit. A voltage obtained by using resistors R4 and R5 to divide the voltage between Vo and VEE is input to the operational amplifier OP4. This divided voltage level is subjected to impedance conversion by the operational amplifier OP4, and is output as V4. It should be noted, however, that OP4 need not be provided and this divided voltage level can be output without modification as V4. FIG. 12 also indicates that the first power sources Vo and VEE are used without modification as V3 and V5, but it is not necessary to limit this embodiment of the invention thereto.

Note that C3 and C4 denote voltage smoothing capacitors. Note also that it is not necessary to provide the capacitor C12 of FIG. 12; the capacitors C3 and C4 can be used instead for holding the voltage Vo.

The operational amplifier OP1 of Embodiment 8 is supplied with power from the first power sources VDD and VSS, and thus is powered by a voltage of (VDD−VSS) . Since the waveform signals of shown in FIG. 2 are input from the pulse control circuit 20, the voltage level of Vo is set to (VEE+VDD−VSS) by the same operation as that of Embodiment 5. This ensures that the operational amplifier OP2 is also supplied with power from the first power sources VDD and VSS, and thus is powered by a voltage of (VDD−VSS). This enables a great reduction in the currents caused by the idling currents of the operational amplifiers and the switching of the voltage levels of the segment electrodes, and thus makes it possible to design a lower power consumption.

In previous embodiments such as Embodiment 1, or in the prior-art circuit, resistors are connected between VDD and VEE to obtain divided voltage levels. This means that, if the voltage between VDD and VEE should increase concomitant with an increase in the duty ratio of the liquid crystal display device, the currents flowing through theses resistors would increase, making it difficult to reduce power consumption. In contrast, Embodiment 8 has resistors R1 and R2 connected between VDD and VSS, and resistors R4 and R5 connected between Vo and VEE. Thus, the voltage between VDD and VEE will increase, while the voltages between VDD and VSS and between Vo and VEE remain virtually unchanged, even if the duty ratio of the liquid crystal display device is increased. Therefore, the current flowing through these resistors does not increase, enabling a design with an even lower power consumption than that of other embodiments such as Embodiment 1.

The voltage conversion circuit 10 of FIG. 12 is configured of components such as SW1 to SW4 and C11, but should not be limited to this configuration. For example, another voltage conversion circuit 9 shown FIG. 13 comprises a transformer T1, a diode D1 and a switch SW1. The switch SW1 is intended to turn on and off in answer to a signal CK3 from a pulse control circuit 19, and any switching element such as a bipolar transistor, a MOSFET, or a relay may be used as this switch SW1 . The voltage conversion circuit 9 functions as a switching regulator circuit where input and output are mutually isolated. The circuit 9 turns SW1 on and off, and generates an AC current in the secondary coil of the transformer T1 by passing an AC current through the primary coil of the transformer T1. The thus generated AC current is rectified by the diode D1, and also the voltage generated at one end of the diode D1 is smoothed by a capacitor C12.

This generates a DC voltage level Vo that is isolated from VDD and VSS. The pulse control circuit 19 feeds back the voltage between Vo (V3) and VEE (V5), and controls the signal CK3 in such a manner that the voltage between Vo and VEE is held constant.

Various different configurations can be used as implementations of the above voltage conversion circuit.

Figure 14:
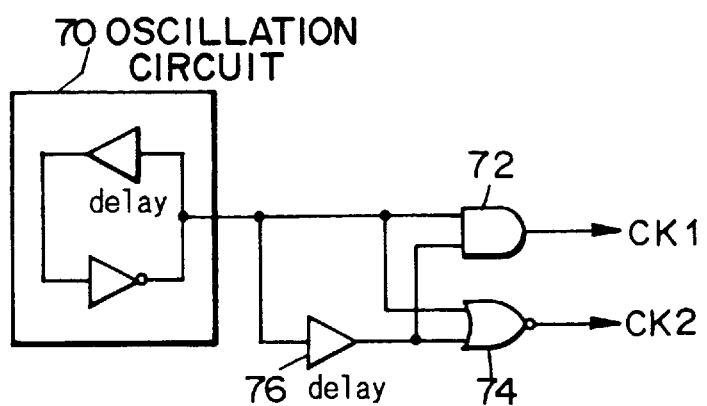
FIG. 14 shows an example of the configuration of a pulse control circuit.
Figure 15:
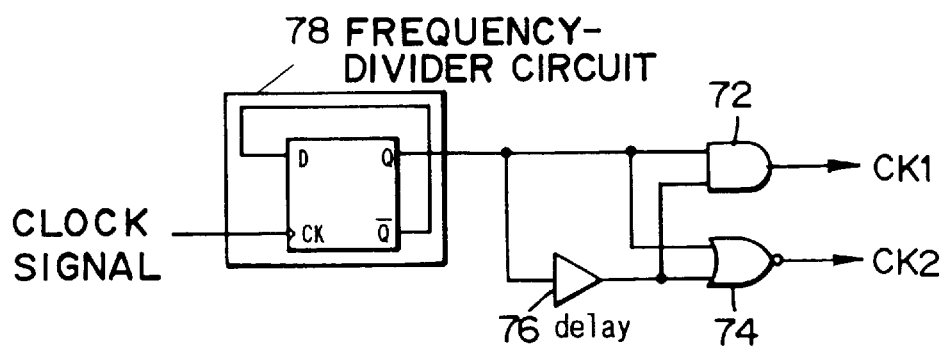
FIG. 15 shows another example of a pulse control circuit.

Examples of the configuration of the pulse control circuit are shown in FIGS. 14 and 15. If SW1 , SW2, SW3 and SW4 are all simultaneously turned on, problems such as a fall in the voltage level of Vo will occur. That is why it is necessary to ensure that the signals CK1 and CK2 do not overlap, as shown in FIG. 2. To ensure this, an oscillation signal that is output from an oscillation circuit 70 is input to a circuit comprising an AND gate 72, a NOR gate 74, and a delay circuit 76, as shown in FIG. 14, to obtain the signals CK1 and CK2. Alternatively, the frequency of a clock signal supplied from outside the device is divided by a frequency-divider circuit 78, and is input to the circuit comprising the AND gate 72, NOR gate 74, and delay circuit 76, as shown in FIG. 15. Since the circuit of FIG. 15 does not require an oscillation circuit, the circuit has the advantage that it is easy to incorporate an integrated circuit that enables reductions in circuit size and power consumption.

Embodiment 9

Figure 16:
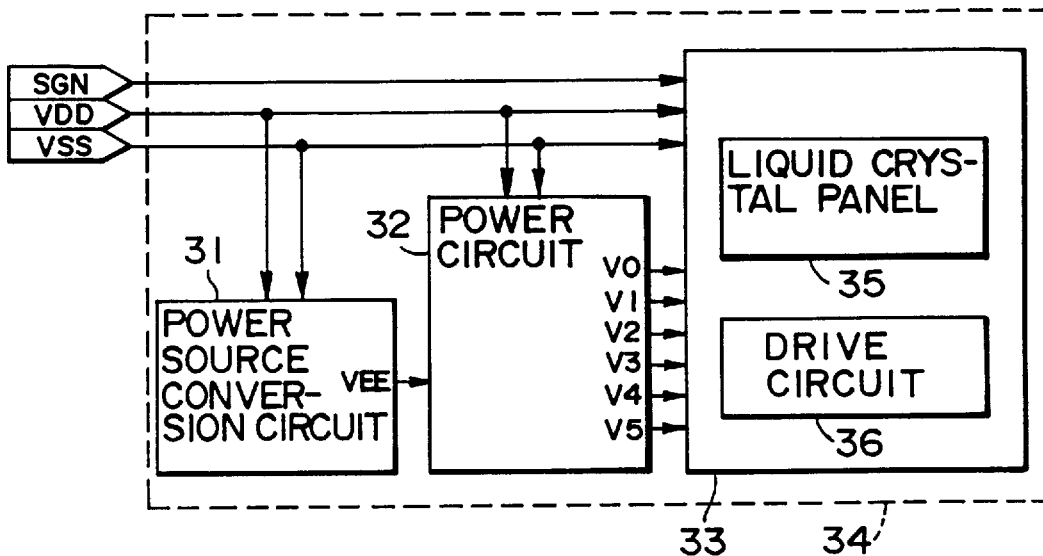
FIG. 16 shows an example of the configuration of a liquid crystal display device in accordance with a ninth embodiment.

FIG. 16 shows an example of the configuration of a liquid crystal display device which comprises a power circuit of this invention and which is multiplex driven, as a ninth embodiment of this invention. The liquid crystal display device 34 comprises a power source conversion circuit 31, a power circuit 32 and a display unit 33. The display unit 33 comprises a liquid crystal display circuit 35 wherein liquid crystal elements are arranged in a matrix form and a drive circuit 36 for driving this liquid crystal display circuit 35. The power circuit 32 is one of the power circuits described in Embodiments 1 to 8. The voltage levels V0 to V5 generated by the power circuit 32 are supplied to the display unit 33. The power sources VDD and VSS are logic-driving power sources (digital power sources), and are supplied from the outside of the liquid crystal display device 34 together with a signal SGN for controlling the drive circuit 36. The power source conversion circuit 31 generates the power source VEE from the power sources VDD and VSS, then supplies the power source VEE to the power circuit 32. FIG. 16 shows a configuration in which the power source VEE is generated within the liquid crystal display device using this power source conversion circuit 31. Nevertheless, a configuration in which the power source VEE is supplied to the power circuit 32 from outside the liquid crystal display device 34 may equally well be used.

If the prior-art circuit of FIG. 20 were to be used in the power circuit 32, a large current would flow from the power source VDD to VEE, and the power source conversion circuit 31 supplying this current would inevitably have to be large. Thus, it would be difficult to incorporate the power source conversion circuit 31 into the liquid crystal display device 34, from the mounting space point of view. However, if one of the configurations illustrated by Embodiments 1 to 8 is used as the power circuit 32, the current flowing from the power source VDD to VEE can be greatly reduced and the power source conversion circuit 31 can be made smaller. This makes it possible to incorporate the power source conversion circuit 31 in the liquid crystal display device 34, enabling a more compact liquid crystal display device.

This embodiment makes it possible to supply only power sources VDD and VSS from the outside, reduce the numbers of power sources necessary for the liquid crystal display device, and further promote the convenience thereof. This embodiment uses the logic power sources VDD and VSS as power sources for the drive circuit 36, and generates the groups of drive voltages V0 to V5 for driving the liquid crystal device therefrom. This means that the number of power sources required for the liquid crystal display device can be further reduced, and thus fostering convenience thereof.

Embodiment 10

Figure 17:
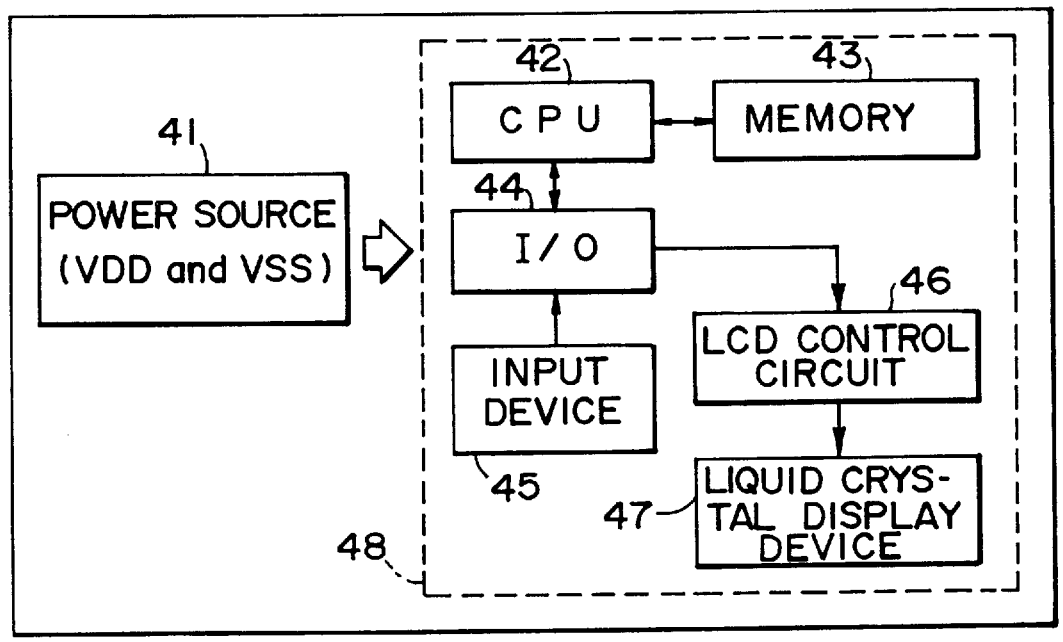
FIG. 17 shows an example of the configuration of a personal computer in accordance with a tenth embodiment.
Figure 18:
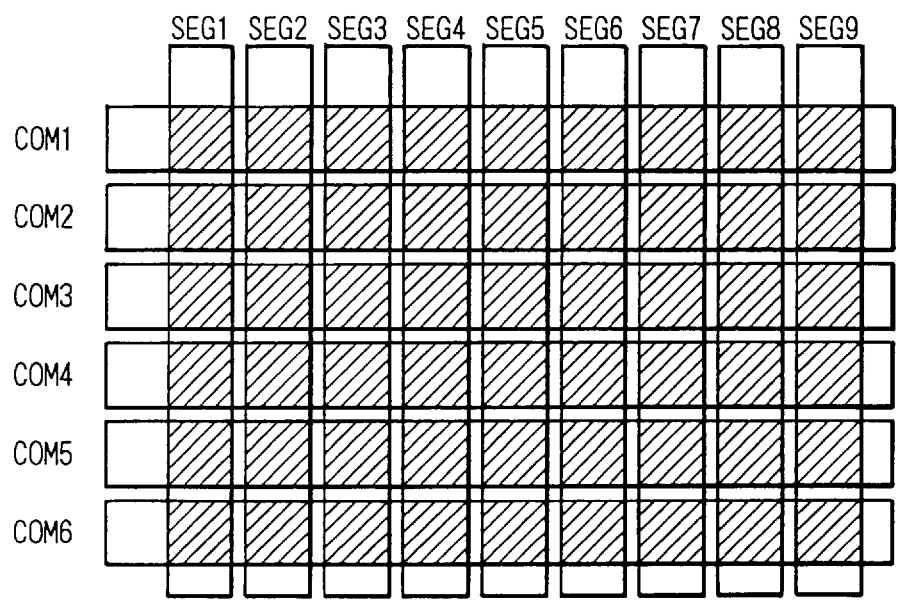
FIG. 18 is a schematic diagram of electrodes of a multiplex driven liquid crystal panel.
Figure 19:
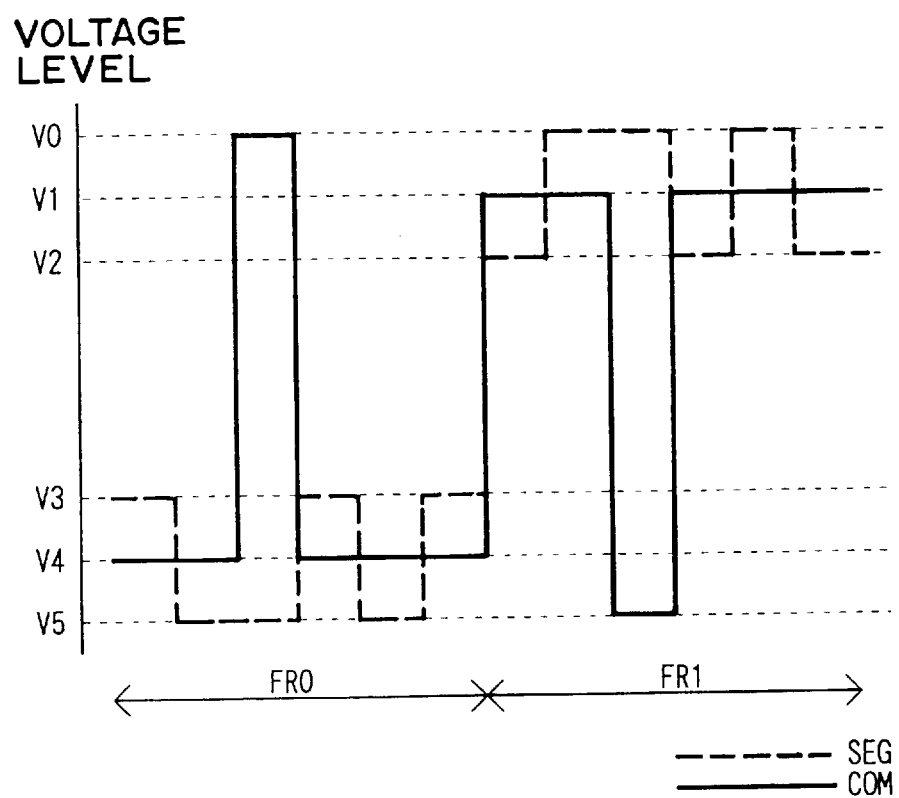
FIG. 19 is a diagram illustrative of signals applied to segment and common electrodes.

A tenth embodiment of this invention illustrates an example of incorporating into a personal computer which is an electronic equipment a liquid crystal display device that is provided with the power circuit of this invention. The configuration of this example is shown in FIG. 17. This personal computer 48 comprises a power source 41, CPU 42, memory 43, an input-output port (I/O section) 44, an input device 45 such as a keyboard or mouse, an LCD control circuit 46 and a liquid crystal display device 47. The LCD control circuit 46 converts signals output from the I/O section 44 into control signals for the liquid crystal display device. Any configuration such as that of Embodiment 9 may be used as the liquid crystal display device 47. The power source 41 supplies power, such as logic power sources VDD and VSS.

Use of a liquid crystal display device 47 in accordance with Embodiment 9 enables a reduction in the power consumption of the entire personal computer 48. Since it is necessary to use only VDD and VSS as power sources, the configuration of the power circuit of the personal computer 48 can be simplified. The above described improvements are not limited to personal computers; they can be applied to any type of electronic equipment that uses a liquid crystal display device provided with the power circuit of this invention.

Note that this invention is not limited to the above described Embodiments 1 to 10; it can be implemented in various other forms within the scope of this invention.

For example, the above described embodiments are described as applications of the present invention to a liquid crystal display device that is multiplex driven by a six-level method. However, it should be obvious that this invention is not limited thereto and can equally well be applied to other fields, such as a liquid crystal display device that is driven by a method other than a six-level method, or a display device that drives display elements other than liquid crystal elements.

The above described embodiments use a first drive voltage source as V0 to V2 and a second drive voltage source as V3 to V5, but this invention may equally well be implemented with these voltage sources reversed.

Figure 13:
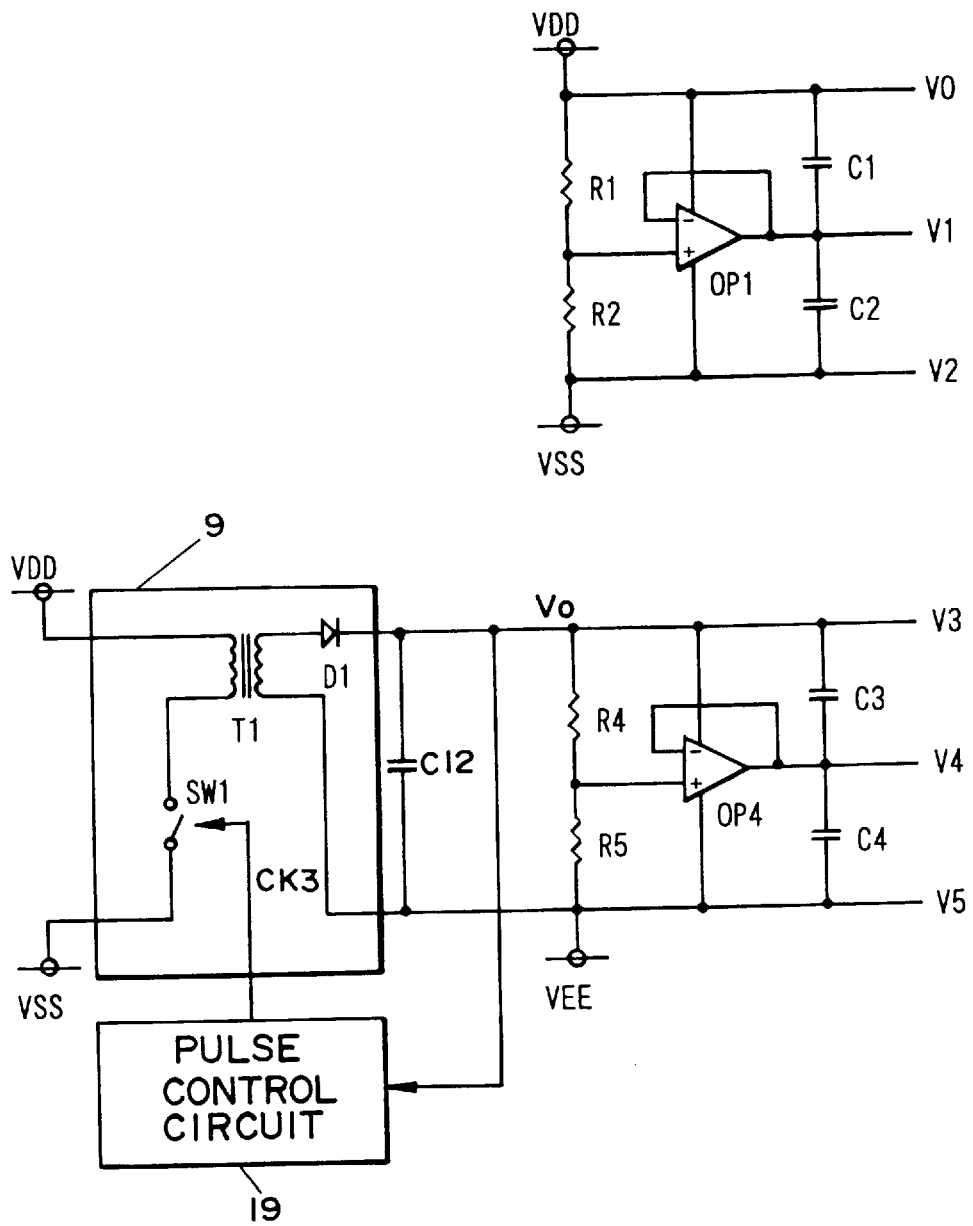
FIG. 13 shows another example of a voltage conversion circuit.

Furthermore, various configurations that combine elements of Embodiments 1 to 8 can be used as a power circuit in accordance with this invention. For example, the methods of Embodiment 2 (FIG. 3), Embodiment 3 (FIG. 4) and Embodiment 4 (FIG. 5) are each described as being modifications of Embodiment 1. Nevertheless, they can equally well be applied to modifying further embodiments of this invention, such as Embodiment 5 (FIG. 7), Embodiment 6 (FIG. 8), Embodiment 7 (FIG. 10) and Embodiment 8 (FIGS. 12 and 13). In the same manner, the methods of Embodiments 6 and 7 are not limited to Embodiment 5, but can be applied to modifications of any other embodiment of this invention.

I claim:

1. A power circuit for supplying to display elements a first group of drive voltages and a second group of drive voltages which has a voltage range that is non-overlapping and separate from said first group of drive voltages, based on a first power source supplying voltage levels including first and second voltage levels and a second power source supplying at least one voltage level including a third voltage level differing from said first and second voltage levels, comprising:

a supply circuit powered by said first power source, for supplying said first group of drive voltages, a voltage conversion circuit for converting said voltage levels of said first group of drive voltages supplied from said supply circuit and outputting said second group of drive voltages which are set with reference to said third voltage level, wherein said voltage conversion circuit comprises:

at least one voltage conversion capacitor, a first group of switches connected to said voltage conversion capacitor for turning on and off in order to charge said voltage conversion capacitor by said first group of drive voltages, and a second group of switches connected to said voltage conversion capacitor for turning on and off in order to discharge said voltage conversion capacitor and output said second group of drive voltages.

2. The power circuit as defined in claim 1, wherein said voltage conversion capacitor and said first and second groups of switches are provided in sets for alternately turning on and off each of sets of said first groups of switches and each of sets of said second groups of switches, and for alternately charging and discharging each of sets of said voltage conversion capacitor.

3. The power circuit as defined in claim 1, further comprising a circuit for lowering impedance between a voltage level included within said first power source and a voltage level included within said third power source, when a voltage difference between voltage levels included within said first power source drops.

4. A power circuit for supplying to display elements a first group of drive voltages and a second group of drive voltages which has a voltage range that is non-overlapping and separate from said first group of drive voltages, based on a first power source supplying voltage levels including first and second voltage levels and a second power source supplying at least one voltage level including a third voltage level differing from said first and second voltage levels, comprising:

a first supply circuit powered by said first power source for supplying said first group of drive voltages, a voltage conversion circuit for converting voltage levels of said first power source and outputting a voltage level of a third power source which is set with reference to said third voltage level, and a second supply circuit powered by said third power source for supplying said second group of drive voltages, wherein said voltage conversion circuit comprises:

at least one voltage conversion capacitor;

a first group of switches connected to said voltage conversion capacitor for turning on and of in order to charge said voltage conversion capacitor by said first power source, and a second group of switches connected to said voltage conversion capacitor for turning on and off in order to discharge said voltage conversion capacitazor and output the voltage level of said third power source.

5. The power circuit as defined in claim 4 further comprising:
a circuit for outputting at least one first divided voltage level for supplying said first group of drive voltages, using said first and second voltage levels of said first power source, and
a circuit for outputting at least one second divided voltage level for supplying said second group of drive voltages, using the voltage level of said third power source and said third voltage level of said second power source.

6. The power circuit as defined in claim 5, further comprising a circuit for monitoring said third power source and halting the operation of at least one of said first and second groups of switches.

7. The power circuit as defined in claim 6, further comprising a circuit for monitoring said third power source and supplying a current to said third power source from at least one of said first and second power sources.

8. The power circuit as defined in claim 5, further comprising a circuit for monitoring said third power source and supplying a current to said third power source from at least one of said first and second power sources.

9. The power circuit as defined in claim 5, wherein said voltage conversion capacitor and said first and second groups of switches are provided in sets, for alternately turning on and off each of sets of said first groups of switches and each of sets of said second groups of switches, and for alternately charging and discharging each of sets of said voltage conversion capacitor.

10. The power circuit as defined in claim 5, further comprising a circuit for lowering impedance between a voltage level included within said first power source and a voltage level included within said third power source, when a voltage difference between voltage levels included within said first power source drops.

11. The power circuit as defined in claim 4, further comprising a circuit for monitoring said third power source and halting the operation of at least one of said first and second groups of switches.

12. The power circuit as defined in claim 11, further comprising a circuit for monitoring said third power source and supplying a current to said third power source from at least one of said first and second power sources.

13. The power circuit as defined in claim 4, further comprising a circuit for monitoring said third power source and supplying a current to said third power source from at least one of said first and second power sources.

14. The power circuit as defined in claim 4, wherein said voltage conversion capacitor and said first and second groups of switches are provided in sets, for alternately turning on and off each of sets of said first groups of switches and each of sets of said second groups of switches, and for alternately charging and discharging each of sets of said voltage conversion capacitor.

15. The power circuit as defined in claim 4, further comprising a circuit for lowering impedance between a voltage level included within said first power source and a voltage level included within said third power source, when a voltage difference between voltage levels included within said first power source drops.

16. A liquid crystal display devices, comprising:
a) a power circuit for providing a first group of drive voltages and a second group of drive voltages which has a voltage range that is non-overlapping and separate from said first group of drive voltages, based on a first power source supplying voltage levels including first and second voltage levels and a second power source supplying at least one voltage level including a third voltage level differing from said first and second voltage levels, the power circuit comprising:
a supply circuit powered by said first power source, for supplying said first group of drive voltages,
a voltage conversion circuit for converting said voltage levels of said first group of drive voltages supplied from said supply circuit and outputting said second group of drive voltages which are set with reference to said third voltage level, wherein said voltage conversion circuit comprises:
at least one voltage conversion capacitor,
a first group of switches connected to said voltage conversion capacitor for turning on and off said in order to charge said voltage conversion capacitor by said first group of drive voltages, and
a second group of switches connected to said voltage conversion capacitor for turning on and off said in order to discharge said voltage conversion capacitor and output said second group of drive voltages,
b) a liquid crystal panel wherein liquid crystal elements are arranged in a matrix form, and
c) a drive circuit for driving said liquid crystal panel, wherein said drive circuit drives said liquid crystal panel based on said first and second groups of drive voltages supplied from said power circuit.

17. The liquid crystal display device as defined in claim 16, wherein said first power source is a logic-driving power source acting as a power source for said drive circuit.

18. An electronic equipment, comprising:
a liquid crystal display device, the liquid crystal display device comprising
a) a power circuit for providing a first group of drive voltages and a second group of drive voltages which has a voltage range that is non-overlapping and separate from said first group of drive voltages, based on a first power source supplying voltage levels including first and second voltage levels and a second power source supplying at least one voltage level including a third voltage level differing from said first and second voltage levels, the power circuit comprising:
a supply circuit powered by said first power source, for supplying said first group of drive voltages,
a voltage conversion circuit for converting said voltage levels of said first group of drive voltages supplied from said supply circuit and outputting said second group of drive voltages which are set with reference to said third voltage level, wherein said voltage conversion circuit comprises:
at least one voltage conversion capacitor,
a first group of switches connected to said voltage conversion capacitor for turning on and off said in order to charge said voltage conversion capacitor by said first group of drive voltages, and
a second group of switches connected to said voltage conversion capacitor for turning on and off said in order to discharge said voltage conversion capacitor and output said second group of drive voltages,
b) a liquid crystal panel wherein liquid crystal elements are arranged in a matrix form, and
c) a drive circuit for driving said liquid crystal panel, wherein said drive circuit drives said liquid crystal panel based on said first and second groups of drive voltages supplied from said power circuit, thereby reducing an amount of power consumed by said electronic equipment.

* * * * *